(12) United States Patent  
 Hoertz

(10) Patent No.: US 11,164,198 B2  
(45) Date of Patent: Nov. 2, 2021

(54) GRAPHICAL USER INTERFACE FOR VISUALIZING MARKET SHARE ANALYSIS

(71) Applicant: ASK Chemicals LLC, Wilmington, DE (US)

(72) Inventor: Charles Conley Hoertz, Dublin, OH (US)

(73) Assignee: ASK CHEMICALS LLC, Wilmington, DE (US)

( * ) Notice: Subject to any disclaimer, the term of this patent is extended or adjusted under 35 U.S.C. 154(b) by 0 days.

(21) Appl. No.: 16/781,658

(22) Filed: Feb. 4, 2020

(65) Prior Publication Data

US 2020/0175532 A1  Jun. 4, 2020

Related U.S. Application Data

(60) Continuation-in-part of application No. 16/688,329, filed on Nov. 19, 2019, now Pat. No. 10,713,673, which is a division of application No. 15/475,972, filed on Mar. 31, 2017, now Pat. No. 10,540,668.

(51) Int. Cl.  
 *G06Q 30/02* (2012.01)

(52) U.S. Cl.  
 CPC .................. *G06Q 30/0205* (2013.01)

(58) Field of Classification Search  
 CPC ........... G06Q 30/0202; G06Q 30/0204; G06Q 10/067; G06Q 10/06398; G06Q 10/0639; G06Q 10/06393; G06Q 10/063; G06Q 30/0205; G06Q 30/0201; G06Q 10/0637  
 See application file for complete search history.

(56) References Cited

U.S. PATENT DOCUMENTS

| | | |
|---|---|---|
| 5,032,989 A | 7/1991 | Tornetta |
| 6,078,924 A * | 6/2000 | Ainsbury ............... G06F 16/951 |
| 6,240,360 B1 | 5/2001 | Phelan |
| 6,578,009 B1 | 6/2003 | Shinozaki |
| 6,704,016 B1 * | 3/2004 | Oliver ................... G06F 3/0485 |
| | | 345/440.2 |
| 6,850,895 B2 | 2/2005 | Broderson et al. |
| 6,963,826 B2 | 11/2005 | Hanaman et al. |
| 6,975,999 B2 | 12/2005 | Moore |
| 7,174,301 B2 | 2/2007 | Florance et al. |
| 7,308,704 B2 | 12/2007 | Vogel et al. |
| 7,340,410 B1 | 3/2008 | Vaillancourt et al. |

(Continued)

OTHER PUBLICATIONS

Blakeston, Alesandra, Create Combination Stacked/Clustered Charts in Excel Wordpress.com, Jan. 28, 2013 (Year: 2013).*

(Continued)

*Primary Examiner* — Scott L Jarrett  
(74) *Attorney, Agent, or Firm* — Standley Law Group LLP

(57) ABSTRACT

Systems and methods for identifying market share and sales potential are provided. Data is retrieved from databases with sales revenue potential and forecasted sales revenue of a company. Retrieved data is categorized to reflect user input indicating a type of market share analysis to be performed. The categorized data is provided at a graphical representation comprising a bar for each category. A first portion of the bar reflects a total value of the potential sales revenue and a second portion of the bar reflects the forecasted sales revenue such that relative market share may be quickly assessed.

15 Claims, 23 Drawing Sheets  
(16 of 23 Drawing Sheet(s) Filed in Color)

(56) References Cited

U.S. PATENT DOCUMENTS

| | | | |
|---|---|---|---|
| 7,447,700 B1 | 11/2008 | Behera et al. | |
| 7,620,564 B1 | 11/2009 | Lippock | |
| 7,779,344 B1* | 8/2010 | Hao | G06Q 10/06 |
| | | | 715/215 |
| 7,974,865 B2 | 7/2011 | Patnaik et al. | |
| 8,015,038 B2 | 9/2011 | Gennaro et al. | |
| 8,315,791 B2 | 11/2012 | Bales et al. | |
| 8,510,659 B2 | 8/2013 | Lam et al. | |
| 8,626,572 B2 | 1/2014 | Colliat et al. | |
| 8,799,796 B2 | 8/2014 | Ehrler et al. | |
| 8,812,345 B2 | 8/2014 | Cragun et al. | |
| 8,984,433 B2* | 3/2015 | Martone | G06F 40/177 |
| 9,229,609 B2* | 1/2016 | Armitage | G06F 3/0481 |
| 9,230,351 B2 | 1/2016 | Dodgen et al. | |
| 9,400,958 B2 | 7/2016 | B'Far et al. | |
| 9,420,100 B2 | 8/2016 | Bellini et al. | |
| 9,626,637 B2 | 4/2017 | Winters | |
| 9,760,237 B2 | 9/2017 | Eraker et al. | |
| 10,108,974 B1 | 10/2018 | Shariff et al. | |
| 10,140,743 B2 | 11/2018 | Hochmuth et al. | |
| 10,262,327 B1 | 4/2019 | Hardebeck et al. | |
| 10,579,647 B1* | 3/2020 | Allsopp | G06F 16/287 |
| 10,860,640 B2* | 12/2020 | Podlesny | G06F 16/54 |
| 2001/0033284 A1 | 10/2001 | Chan | |
| 2003/0208468 A1* | 11/2003 | McNab | G06Q 10/063 |
| 2004/0068431 A1* | 4/2004 | Smith | G06Q 10/06375 |
| | | | 705/7.14 |
| 2004/0133462 A1* | 7/2004 | Smith | G06Q 30/0202 |
| | | | 705/7.31 |
| 2004/0138944 A1 | 7/2004 | Whitacre et al. | |
| 2004/0139102 A1 | 7/2004 | Vierich et al. | |
| 2004/0225955 A1 | 11/2004 | Ly | |
| 2005/0096969 A1* | 5/2005 | Sevio | G06Q 10/04 |
| | | | 705/7.31 |
| 2005/0102284 A1 | 5/2005 | Srinivasan et al. | |
| 2005/0131710 A1 | 6/2005 | Sahagian | |
| 2005/0192930 A1* | 9/2005 | Hightower | G06Q 30/02 |
| 2005/0231392 A1 | 10/2005 | Meehan et al. | |
| 2005/0278286 A1 | 12/2005 | Djugash et al. | |
| 2006/0112123 A1 | 5/2006 | Clark et al. | |
| 2006/0167704 A1 | 7/2006 | Nicholls et al. | |
| 2006/0200383 A1 | 9/2006 | Artunian et al. | |
| 2006/0293930 A1 | 12/2006 | Rodgers et al. | |
| 2007/0015518 A1 | 1/2007 | Winter et al. | |
| 2007/0043609 A1 | 2/2007 | Imam et al. | |
| 2008/0034314 A1 | 2/2008 | Louch et al. | |
| 2008/0082386 A1 | 4/2008 | Cunningham et al. | |
| 2008/0086359 A1* | 4/2008 | Holton | G06Q 30/0201 |
| | | | 705/7.29 |
| 2008/0195930 A1 | 8/2008 | Tolle | |
| 2008/0312987 A1 | 12/2008 | Damodaran et al. | |
| 2009/0002373 A1* | 1/2009 | MacGregor | G06F 16/248 |
| | | | 345/440.2 |
| 2009/0248490 A1* | 10/2009 | Moncreiff | G06Q 30/0201 |
| | | | 705/7.34 |
| 2009/0319931 A1 | 12/2009 | Hutchings et al. | |
| 2010/0057525 A1* | 3/2010 | Wagner | G06Q 30/0202 |
| | | | 705/7.31 |
| 2010/0121675 A1* | 5/2010 | Charles | G06Q 30/0202 |
| | | | 705/7.31 |
| 2010/0228752 A1 | 9/2010 | Folting et al. | |
| 2011/0205231 A1 | 8/2011 | Hartley et al. | |
| 2011/0208562 A1 | 8/2011 | Hartley et al. | |
| 2011/0225525 A1 | 9/2011 | Chasman et al. | |
| 2011/0283231 A1 | 11/2011 | Richstein et al. | |
| 2012/0123963 A1* | 5/2012 | Shan | G06Q 40/06 |
| | | | 705/36 R |
| 2012/0272186 A1* | 10/2012 | Kraut | G06F 3/0482 |
| | | | 715/810 |
| 2012/0297327 A1 | 11/2012 | Chow et al. | |
| 2013/0013589 A1 | 1/2013 | Stevenson et al. | |
| 2013/0030866 A1* | 1/2013 | Ragland | G06Q 30/02 |
| | | | 705/7.31 |
| 2013/0111321 A1 | 5/2013 | Dorrell | |
| 2013/0179225 A1 | 7/2013 | Nadiadi et al. | |
| 2013/0339291 A1 | 12/2013 | Hasner | |
| 2014/0033120 A1* | 1/2014 | Bental | G06Q 10/02 |
| | | | 715/803 |
| 2014/0046711 A1 | 2/2014 | Borodow et al. | |
| 2014/0081903 A1 | 3/2014 | Koosel et al. | |
| 2014/0149836 A1 | 5/2014 | Bedard et al. | |
| 2014/0164038 A1 | 6/2014 | Maughan | |
| 2014/0208215 A1 | 7/2014 | Deshpande | |
| 2014/0247268 A1* | 9/2014 | Drucker | G06T 13/80 |
| | | | 345/440.2 |
| 2015/0012278 A1 | 1/2015 | Metcalf | |
| 2015/0088610 A1 | 3/2015 | Bayles et al. | |
| 2015/0120444 A1 | 4/2015 | Deshpande et al. | |
| 2015/0169709 A1* | 6/2015 | Kara | G06F 16/248 |
| | | | 707/736 |
| 2015/0287119 A1 | 10/2015 | Bhan et al. | |
| 2015/0310466 A1 | 10/2015 | LaCivita et al. | |
| 2015/0371158 A1 | 12/2015 | Oberweis et al. | |
| 2016/0071124 A1* | 3/2016 | Lavergne | G06Q 30/0202 |
| | | | 705/7.31 |
| 2016/0103592 A1 | 4/2016 | Prophete et al. | |
| 2016/0104176 A1 | 4/2016 | Kama | |
| 2016/0162165 A1* | 6/2016 | Lingappa | G06F 40/106 |
| | | | 715/771 |
| 2016/0212266 A1 | 7/2016 | Soundar | |
| 2017/0046649 A1 | 2/2017 | Kyle, Jr. et al. | |
| 2017/0069118 A1 | 3/2017 | Stewart | |
| 2017/0083589 A1 | 3/2017 | Prominville et al. | |
| 2017/0286449 A1 | 10/2017 | Strube et al. | |
| 2018/0130152 A1 | 5/2018 | Holbrook et al. | |
| 2019/0333086 A1* | 10/2019 | Chu | H04W 4/029 |

OTHER PUBLICATIONS

Oracle Sales Intelligence—Implementation Guide—Release 11i Oracle, Aug. 2002 (Year: 2002).*
Siebel Analytics—Enterprise Applications User Guide Version 7.7.2 Siebel, Sep. 2004 (Year: 2004).*
Siebel Sales User Guide—Midmarket Edition Version 7.5 Siebel Systems Inc., Sep. 2002 (Year: 2002).*
Monitoring Sales Force, ActitudPro.com, Jul. 10, 2015.
Baker, Jared, App of the Week—Get feedback on meetings with Simple Visit Reports in Salesforce, CloudMyBiz.com, Jan. 31, 2014.
SalesCRM—KaptureCRM, Kapturecrm.com, Nov. 26, 2016.
Track and Follow your Latest Sales Progress—Sales Activity Tracker, Kapturecrm.com/gps-tracking, May 11, 2017.
Persistent Systems Helps VisitOps Launch New Customer Visit Management App on Salesforce AppExchange, Persistent Systems, May 20, 2015.
Create Visit Records and Track Number of Visits, Support.formyoula.com, Dec. 13, 2015.
Tableau Visual Guidebook, Tableau Software, 2010.
Tableau on Tableau: 5 Ways We Look at Our Sales Data, Tableau.com, Sep. 12, 2015.
Getting Started With VisitEye, Visiteye.com, VisitBasis LLC, 2016.
Easily Track Field Teams in Real Time, VisitEye Product Data Sheet, 2016.
VisitEye Tutorial for Admins, VisitEye.com, 2016.
VisitOps.com, Retrieved from Archive.org, Dec. 18, 2014.
AlignStar—Professional Territorial Design Software, Datasourtech.com, 2003.
Cravens, David W., An Analytical Approach for Evaluating Sales Territory Performance, Journal of Marketing, Jan. 1972, vol. 36.
Channin, Jason, ArcGIS Business Analyst—An Introduction ESRI, Sep. 2007.
Cognos 8 Business Intelligence—Report Studio—User Guide Cognos, 2006.
Ergometrics.com Web Pages, Ergometrics.com, Mar. 2000, Retrieved from Archive.org.
Miller, Fred, GIS Tutorial for Marketing—Chapter 9—Managing Sales Territories ESRI Press, 2007.

(56) References Cited

OTHER PUBLICATIONS

ZS Associates—MAPS Territory Alignment, www.zassociates.com, 2002, Retrieved from Archive.org.
Oracle Sales Analytics—Data Sheet Oracle, 2011.
Oracle Business Intelligance Publisher—Report Designer's Guide Oracle, Aug. 2008.
Oracle Territory Management, User Guide Oracle, Apr. 2003.
Prabhankant, Sinha et al., Sales-force decision models: Insights from 25 years of implementation Interfaces, May/Jun. 2001, vol. 31, No. 3.
Li, Miranda, Tableau on Tableau: 5 Ways We Look at Our Sales Data, Tableau.com, Sep. 9, 2015.
Tell a story with your map-enabled BI dashboard ArcGIS Blog, Mar. 31, 2015.
Territory Design, ESRI, Dec. 2010.
Charles, Erik W. et al., Track Sales Performance, ACA News, vol. 43, No. 3, Mar. 2000.

* cited by examiner

Sales Tracker Dash Board

Schedule View | Visits Summary | Sales vs. Visits | Export Data

<< Week 7
(February 12 – 18)

| | Monday | Tuesday | Wednesday | Thursday | Friday |

By Foundry
By Commercial Rep.
Select All

Visits

Search

| Rep Name | Foundry | Visit Date | Time IN | Time OUT | Total Time |
|---|---|---|---|---|---|
| Sales Associate 5 | Company 456 | 02-14-2017 | 07:02 AM | | |
| Sales Associate 4 | Company 534 | 02-14-2017 | 09:51 AM | 10:17 AM | 0:26:0 |
| Sales Associate 4 | Company 789 | 02-14-2017 | 09:51 AM | | |
| Sales Associate 5 | Company 123 | 02-14-2017 | 07:08 AM | | |
| Sales Associate 2 | Company 123 | 02-14-2017 | 07:07 AM | | |

| | Visits |
|---|---|
| Sales Associate 4 | 2 |
| Sales Associate 5 | 1 |
| Sales Associate 2 | 1 |
| Sales Associate 3 | 1 |

FIG. 14

Sales Tracker Dash Board

| Schedule View | Sales vs. Visits | | Annual | QRT | Month | Week | Export Data |
|---|---|---|---|---|---|---|---|

By Foundry ▾

Search

| | Visits | Rep Name | Visit Date | Time IN | Time OUT | Total Time |
|---|---|---|---|---|---|---|
| XYZ Co. | 6 | Sales Associate 7 | 01-06-2017 | 11:13 AM | 01:45 PM | 2:32:0 |
| Foundry X | 5 | Sales Associate 7 | 01-06-2017 | 02:21 PM | 03:43 PM | 1:22:0 |
| EFG Metal Co. | 5 | Sales Associate 7 | 01-17-2017 | 09:45 AM | 02:26 PM | 4:41:0 |
| Foundry B | 5 | Sales Associate 8 | 01-23-2017 | 09:28 PM | 11:27 PM | 1:59:0 |
| Foundry C | 5 | Sales Associate 8 | 01-24-2017 | 08:57 AM | 12:13 PM | 3:16:0 |
| Foundry D | 5 | | | | | |
| Foundry E | 4 | | | | | |
| Foundry A | | Annual Sales | $ 396 | Annual Potential | $ 1,195,402.25 | Visit Total | 5 Visits |
| Foundry G | 4 | | | | | |

62  64

Main View    Visit Details

FIG. 18

GRAPHICAL USER INTERFACE FOR VISUALIZING MARKET SHARE ANALYSIS

CROSS-REFERENCE TO RELATED APPLICATIONS

This application is a continuation in part of U.S. application Ser. No. 16/688,329 filed Nov. 19, 2019, which is a divisional of U.S. application Ser. No. 15/475,972 filed Mar. 31, 2017, the disclosures of each of which are hereby incorporated by reference as if fully restated.

BACKGROUND OF THE INVENTIVE FIELD AND SUMMARY OF THE GENERAL INVENTIVE CONCEPT

The present invention is directed to a system and method for facilitating the identification of potential sales targets by tracking and providing sales target and sales data in an interactive, unified, graphical and coded fashion. Currently there is no system or solution for sales associates traveling in the field to identify sales targets, and their sales potential, easily, interactively, graphically, and in a unified manner. For example, the specific structure and layout of the graphical user interface provides new functionality to the user and aids the user in quickly and efficiently:

providing a graphical and unified map view of potential sales targets coded by icon shape and color, where the color of the icon is determined by the sales potential of the sales target.

filtering and customizing the graphical and unified map view of the sales targets by numerous factors (e.g., for example for foundry sales targets filtering and displaying sales targets by sales representative(s), sales territory(s), state/region(s), business line(s), sales potential, industry/sector(s), metal type(s), molding process, core making process). For example, displaying a list of sales associates, each name adapted to be selected by the user, and in response to being selected by the user, filtering the sales target data and displaying only those sales targets associated with the selected sales associate(s).

providing a selectable icon with a company logo that when selected customizes the graphical view by changing the icon shape to a company logo for each sales target that is a customer of the company.

customizing the graphical view by using a color-coded toggle tool for assigning different colors to different sales associates.

providing a "dashboard" feature that provides a unified view of specific sales target data in a graphical fashion including graphical bar graphs of estimated sales for each sales target versus full potential sales for each sales target, and actual sales for each sales target versus potential sales for each target (broken down by a predetermined time period and by product lines). This dashboard functionality appears over only a portion of the graphical map of the sales region and the system is adapted to change the contents of the dashboard based on the specific sales target selected on the graphical map. In this fashion, the user sees a graphical, color-coded and unified view of relevant sales targets and relevant sales data for selected targets.

providing a selectable circle graph with three concentric lines, one line showing the actual sales for the selected sales target, one line showing estimated sales for the selected sales target, and the third line showing potential sales for the selected sales target, where each line is illustrated in a different color from the other lines.

providing a pop-up window reached from selecting the selectable circle graph, the window appearing partially above the dashboard and graphical map, that provides a graphical view of actual sales for the selected sales target, the estimated sales for the selected target and potential sales for the selected target in one unified view broken down by product line. The system is also adapted so that each product line is selectable by the user so that when selected, sales information for specific products is provided.

providing a reporting functionality accessible from the dashboard interface for allowing users to report new sales data relating to the specific target that is currently being displayed on the dashboard.

dynamically providing the data provided in the graphical map and dashboard ("dynamically" meaning that once new data is supplied (e.g. a user modifies the potential within reporting center)). The data is automatically applied within the map and dashboard. For example, the color of the sales target icon will change automatically based on the sales potential reported by the user.

Furthermore, currently there is no system or solution to effectively track sales target visits by sales associates traveling in the field or to track and determine sales effectiveness by associating sales visits to sales data. The system of the present invention provides a solution to this problem by providing an interactive and graphical view of sales visit information broken down by date or sales territory. The system also allows the user to filter the sales visit information by sales target(s) or sales associate(s). For example, the specific structure and layout of the graphical user interface provides new functionality to the user and aids the user in quickly and efficiently:

tracking sales visits, preferably by satellite global positioning systems (GPS) in the mobile devices of the sales associates.

providing a graphical view of the sales visits filterable by foundry(s) and/or sales associate(s).

providing a graphical view of sales effectiveness by providing a graph showing sales data for sales targets, the system adapted to draw a line on the graph indicating the number of visits to each sales target. In one embodiment, the sales data shown graphically can be in the form of a bar broken down by actual sales versus potential sales and where the graph can be customized to show this information over a predetermined period (annual, quarterly, monthly, weekly).

There is a need for taking such gathered data and creating a market share analysis. The present invention provides a solution to this problem by providing an interactive and graphical view of budget/forecast information, estimated opportunity, and the resulting market share (e.g., by percentage) categorized by industry, business line, competitor, some combination thereof, or the like. The present invention may also permit the user to compare market share data against a target or a specific company. For example, the specific structure and layout of the graphical user interface provides new functionality to the user and aids the user to quickly and efficiently:

Integrate sales data collected into a market share analysis.

graphically represent the market share data filterable by industry, business line, competitor, some combination thereof, or the like.

provide a graphical view of the market share data of a given industry, business line, competitor, some combination thereof, or the like against a particular target or sales data for a specific company.

In one embodiment of the invention, the invention is comprised of: a graphical user interface having an image of a sales region for displaying on a screen; a processing system, the processing system programmed with instructions for executing on the processing system for: displaying on the sales region, a plurality of selectable icons representing the location of potential sales targets; dynamically displaying a first subset of the plurality of selectable icons in a first color, the first color representing sales potential in a first predetermined monetary range; dynamically displaying a second subset of the plurality of selectable icons in a second color, the second color representing sales potential in a second predetermined monetary range, the second predetermined monetary range being lower than the first predetermined monetary range; in response to a selection of a particular one of the plurality of selectable icons, displaying in a first location on the screen a first window; displaying in the first window a summary data region providing information relating to the sales target associated with the selected particular icon; displaying in the first window a sales data region; dynamically displaying in the sales data region sales data relating to the sales target associated with the selected particular icon.

Additionally, the gathered sales data may be categorized by industry, business line, competitor, some combination thereof, or the like into market share data in exemplary embodiments. Such market share data may be displayed in one or more graphical representations. These graphical representations may comprise a comparison against a particular target or sales data for a particular company. Such market share data may be utilized to determine which portions of the market could benefit from additional efforts and which portions of the market are likely to already be saturated. The disclosed systems and methods may permit optimization of sales, marketing, and other efforts.

The foregoing and other features and advantages of the present invention will be apparent from the following more detailed description of the particular embodiments, as illustrated in the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In addition to the features mentioned above, other aspects of the present invention will be readily apparent from the following descriptions of the drawings and exemplary embodiments, wherein like reference numerals across the several views refer to identical or equivalent features, and wherein:

FIG. 14 illustrates one embodiment of the graphical user interface of FIG. 12 showing a listing of sales visits based on sales associates;

FIG. 18 illustrates one embodiment of the graphical user interface of FIG. 12 showing sales versus visits for a selected sales target;

DETAILED DESCRIPTION OF EXEMPLARY EMBODIMENT(S)

The following detailed description of the example embodiments refers to the accompanying figures that form a part thereof. The detailed description provides explanations by way of exemplary embodiments. It is to be understood that other embodiments may be used having mechanical and electrical changes that incorporate the scope of the present invention without departing from the spirit of the invention.

Figure 1:
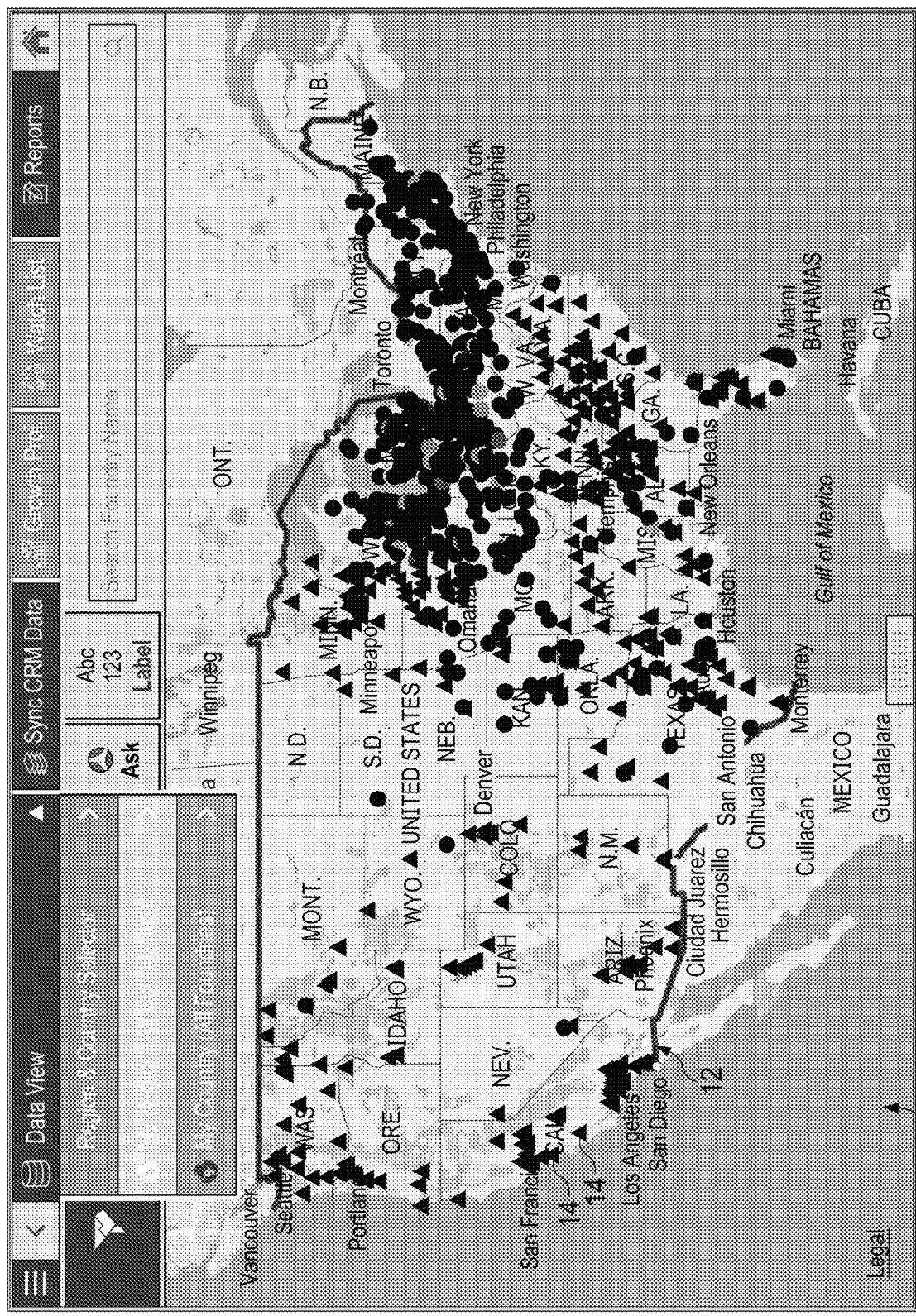
FIG. 1 illustrates one embodiment of a graphical user interface of the present invention showing an image of a sales region and sales target locations.

FIG. 1 illustrates one embodiment of a graphical user interface 10 of the present invention showing an image of a sales region 12 and sales target locations 14. In this embodiment, the sales targets are foundry locations shown by triangles or circles. The triangles represent foundry locations that are distributor-based sales targets (e.g., the company goes through a distributor to make sales to these targets). The circles represent foundry locations that are non-distributor based (e.g., the company sells directly to these sales targets). In the preferred embodiment, the sales targets are represented by selectable icons. The sales target icons are displayed on the map according to their respective geographic location.

In this embodiment, the system dynamically displays a first subset of the plurality of selectable icons in a first color, the first color representing sales potential in a first predetermined monetary range. For example, the first color may be green indicating those sales targets in green color have the highest sales potential (e.g., above $1,000,000). The system also dynamically displays a second subset of the plurality of selectable icons in a second color, the second color representing sales potential in a second predetermined monetary range (e.g., $500,000-$999,999), the second predetermined monetary range being lower than the first predetermined monetary range. It is appreciated that the system can be programmed to code the sales target icons based on various different monetary ranges representing sales potential of the sales targets. For example, a third color can be used to indicate sales targets with sales potentials between $100,000-$499,999. A fourth color can be used to indicate sales targets with sales potentials between $50,000-$99,999. A fifth color can be used to indicate sales targets with sales potential between $0-$49,999, etc.

The graphical user interface provides a unified view of potential sales targets that provides a sales associate traveling on the road with an easy to use, interactive, graphical interface that quickly shows sales target information through coded shapes and colors. The structure of the interface allows the sales associate to quickly identify potential sales targets, to quickly differentiate sales targets, and to determine quickly which targets have the most sales potential. The interface of the present invention also provides the ability to select each of the sales target icons to access more detailed information about each of the sales targets. The more detailed information is also provided according to a specifically structured interface as described below. As illustrated in FIG. 1, a particular sales associate may filter the view by the entire region or the sales country assigned to the sales associate.

Figure 2:
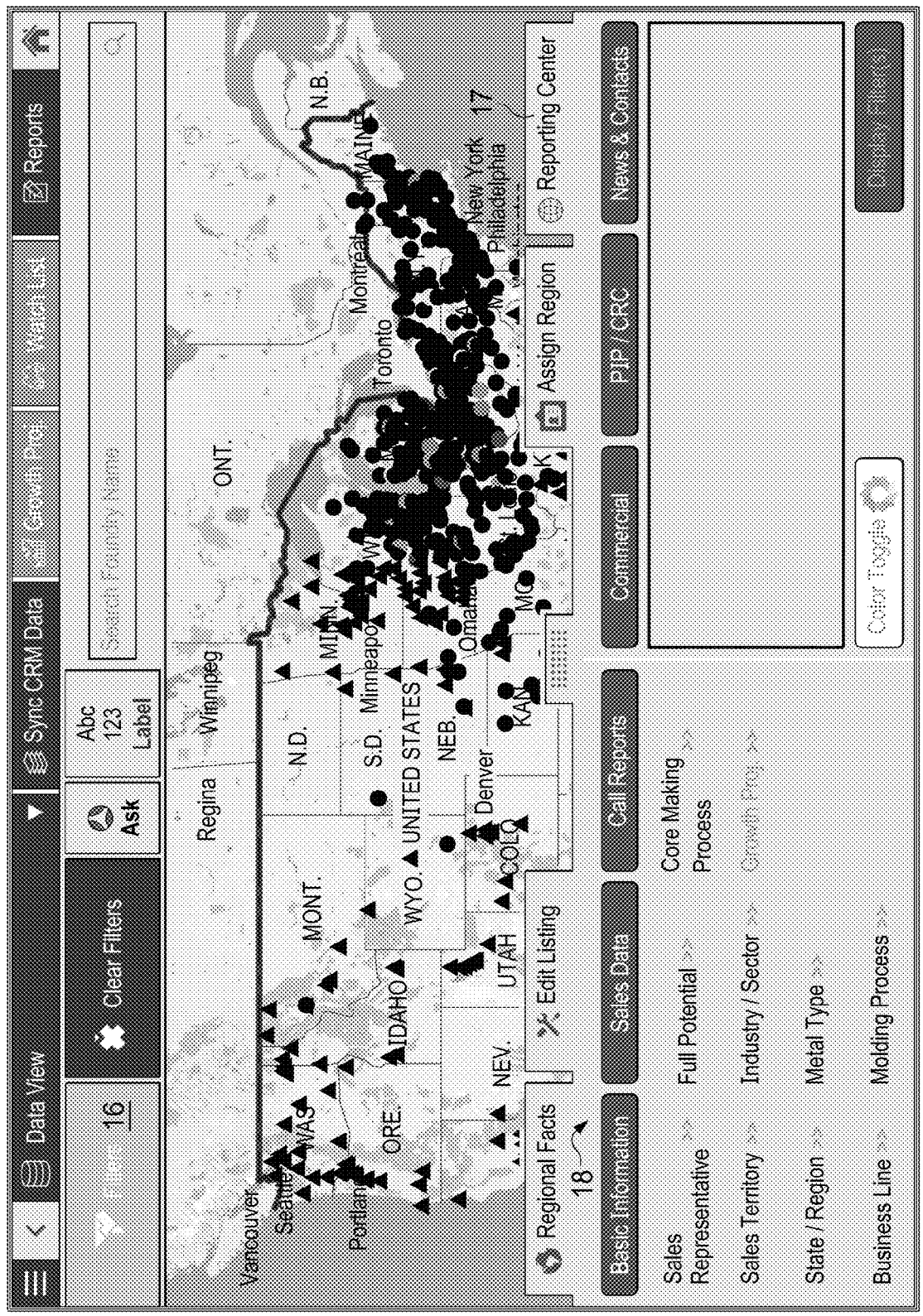
FIG. 2 illustrates one embodiment of a filter window of the present invention.

FIG. 2 illustrates one embodiment of the filter window of the present invention. In response to clicking on the "filter" icon 16, a filter window 18 pops up with a list of various filter factors such as sales representatives, sales potential, sales territory, state/region, industry served, metal type, product line, core making process and molding process. In response to selecting one of the plurality of selectable filter factors, the system is adapted to display, on the sales region, only those sales targets related to the selected filter factor. For example, the user can filter the display of sales targets to show only those targets within a particular range of sales potential. As another example, the user can filter the display of sales targets to show only those targets that use a certain type of molding process. Filtering in this manner assists the sales associate, for example, in determining which products the sales targets may be interested in (as certain molding processes use certain materials).

In response to selecting the sales potential filter factor, the system is adapted to display a plurality of selectable monetary ranges representing ranges of sales potential. In response to selecting a particular monetary range, the system is adapted to display on the sales region, only those sales targets with sales potential in the selected monetary range. For example, the system displays at least a first selectable range of sales potential (e.g., $1,000,000 and above) and a second selectable range of sales potential (e.g., $500,000 to $999,999). In response to selecting the first range of sales potential, the system will display, on the sales region of the graphical interface, only those sales targets that have a sales potential above $1,000,000.

The system preferably has a selectable reporting icon 17. In response to selecting the reporting icon, the system is adapted to display on the screen a reporting window having a plurality of locations for entering information about the selected sales target. Information entered or reported via these locations are stored in the system and the information is dynamically displayed on the image of the sales region and other locations of the graphical user interface as described below.

Figure 3:
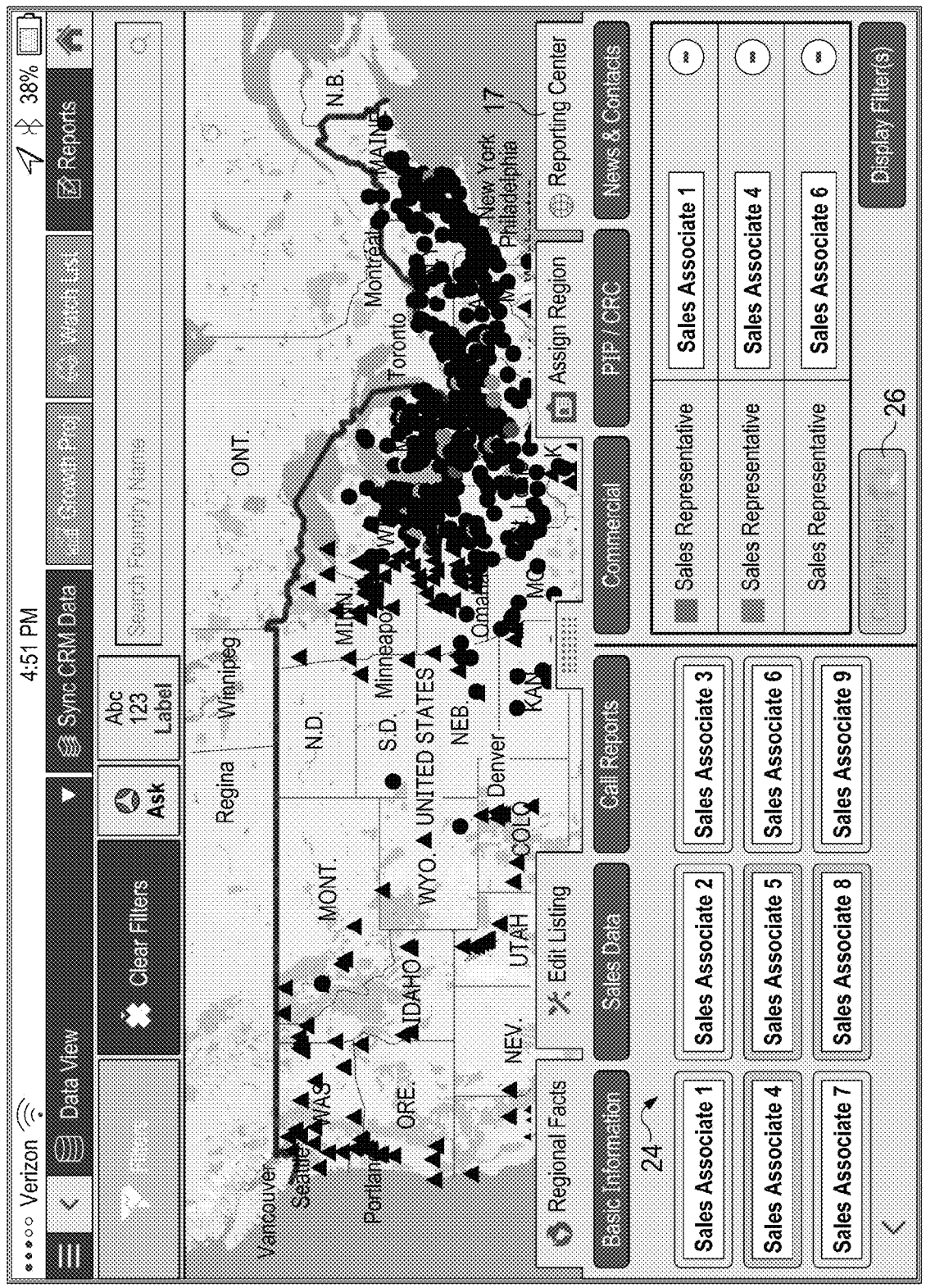
FIG. 3 illustrates one embodiment of a filter window for filtering based on sales associate(s)

FIG. 3 illustrates one embodiment of a filter window for filtering based on sales associate(s). In response to selecting the sales representative filter factor, the system is adapted to display a window 24 with a list of company sales associates/employees (for the purpose of this description, specific names of sales associates have not been used although that is the preferred embodiment—sales associates are herein referred to by an associate number). The user can select one sales associate or a plurality of sales associates from the list. For example, in response to selecting the selectable name of a sales associate, the system is adapted to display, on the sales region, only those potential sales targets that are assigned to the selected sales associate.

In one embodiment, the system is adapted to provide a color toggle feature 26 that assigns different colors to different sales associates. The system is adapted to display the sale target icons on the sales region screen in their assigned colors so that the user can easily ascertain from a quick glance the sales targets assigned to each selected sales associate. For example, if the user selects the name of a first sales associate and the name of a second sales associate from the list of sales associates, the system will filter the information and display, in a first color, all the sales targets associated with the first sales associate, and display, in a second color, all the sales targets associated with the second sales associate.

Figure 4:
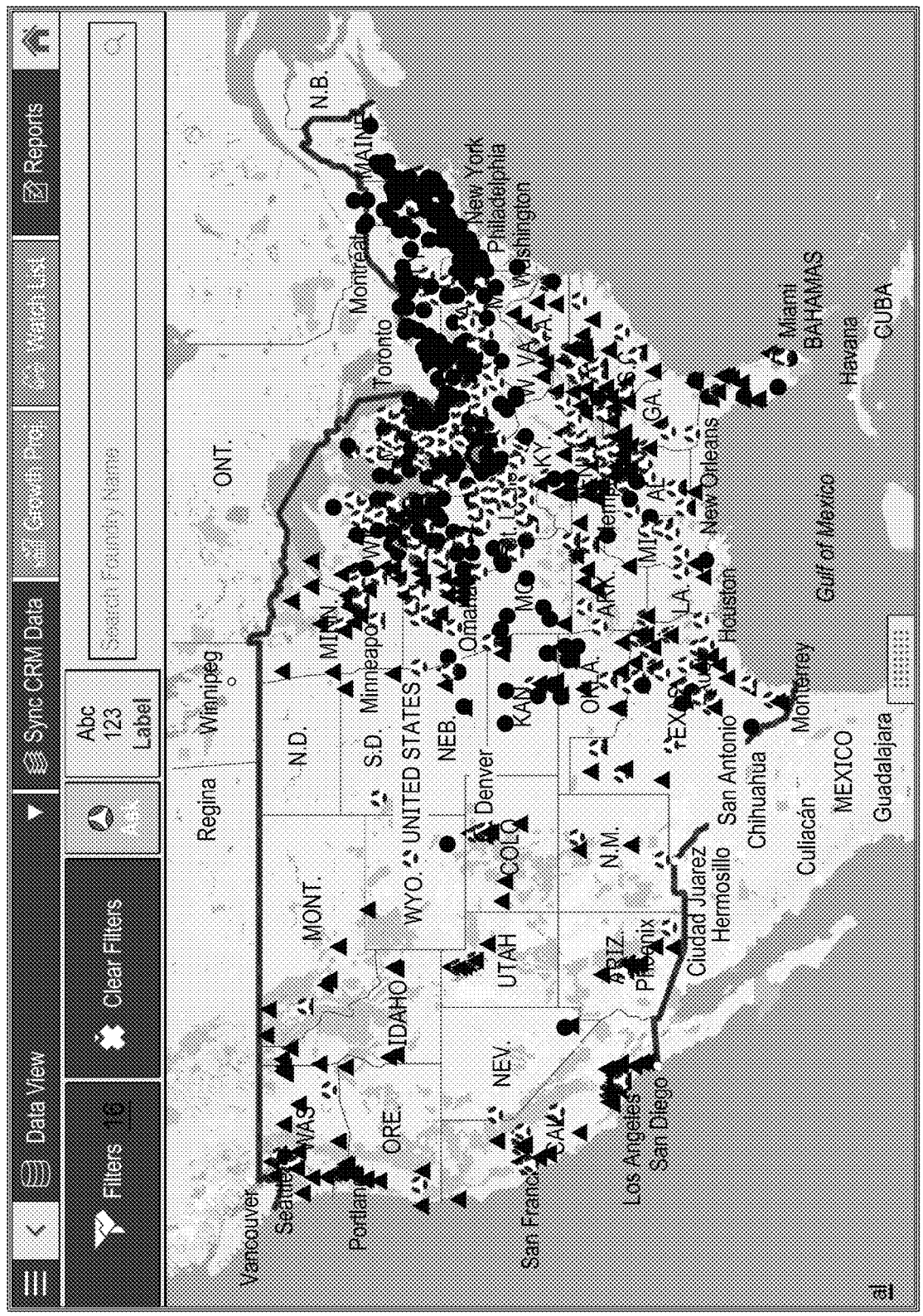
FIG. 4 illustrates one embodiment of the graphical user interface of the present invention showing customization to show existing customers or company sales targets.

FIG. 4 illustrates one embodiment of the graphical user interface of the present invention showing customization to show existing customers or company sales targets. For example, selecting the ASK company logo on the screen instructs the system to display all of the sales targets that are existing customers of the company. Specifically, the system changes sales target icons to the shape of the company logo for those sales targets that are already customers of the company.

Figure 5:
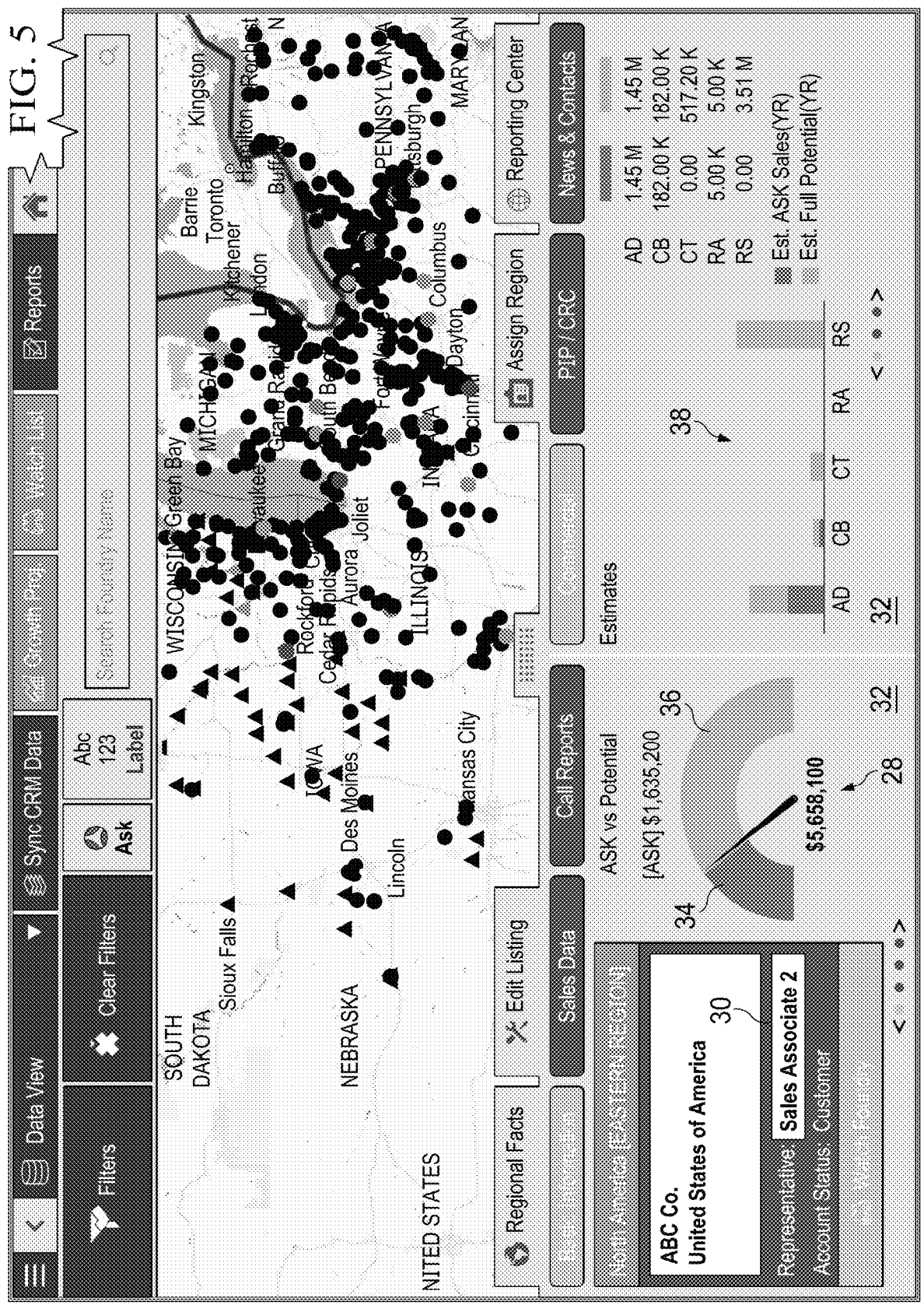
FIG. 5 illustrates one embodiment of a first window shown in response to selecting one of the sales target icons.

FIG. 5 illustrates one embodiment of a first window 28 shown in response to selecting one of the sales targets (represented by a selectable icon) on the sales region screen. The system is adapted to display in the first window a summary data region 30 providing information relating to the sales target associated with the selected particular icon. (In this example, ABC Co. is the selected sales target). The system is also adapted to display in the first window a sales data region 32 for dynamically displaying a first bar graph having a first bar portion 34 representing actual or estimated sales of the sales target associated with the selected sales target and a second bar portion 36 representing potential sales of the sales target associated with the selected icon. In the present application, "dynamically displaying" means to display the information automatically as the data it represents changes (in this embodiment, there is a short time lag between the time the data is changed to the time the data is displayed).

The system is also adapted to display in a second region in the first window a plurality of bar graphs 38, each of the plurality of bar graphs having first bar portion dynamically representing actual or estimated sales of a particular product line of a selected sales target and a second bar portion dynamically representing potential sales of the particular product line of the selected sales target. For the embodiment of FIG. 5, where the sales targets are foundries, the product lines are: release agents (RA), metallurgy (MT), cold box/epoxy (CB), inorganics (IN), additives (AD), risers and sleeves (RS), coatings (CT), no bake/hot box (NB), and filters (FT).

Figure 6:
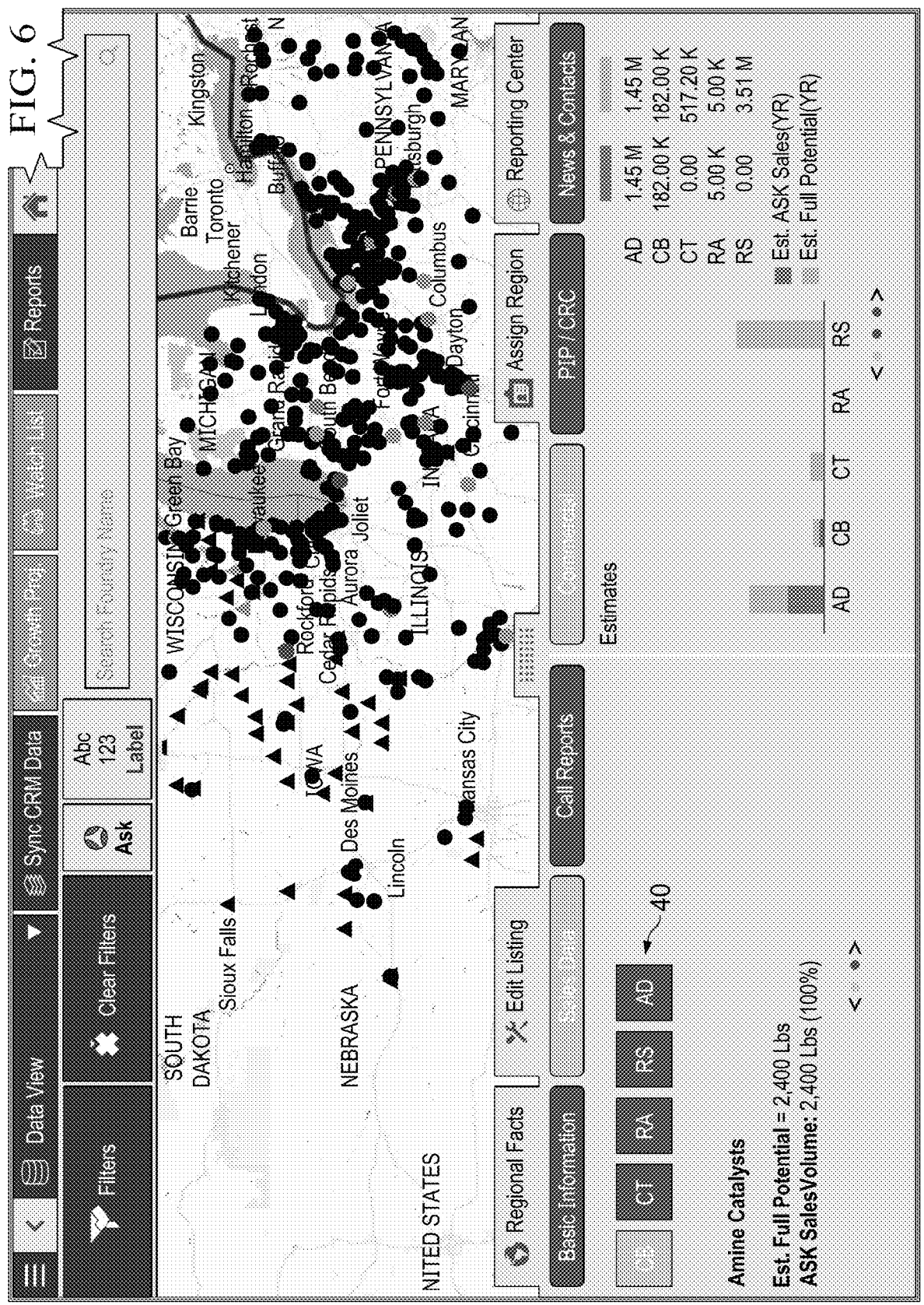
FIG. 6 illustrates one embodiment of the first window showing sales information for a selected sales target broken down by product line.

FIG. 6 illustrates one embodiment of the first window showing sales information for a selected sales target broken down by product line. The user can select other boxes 40 representing different product lines to view detailed sales information for the selected product line.

Figure 7:
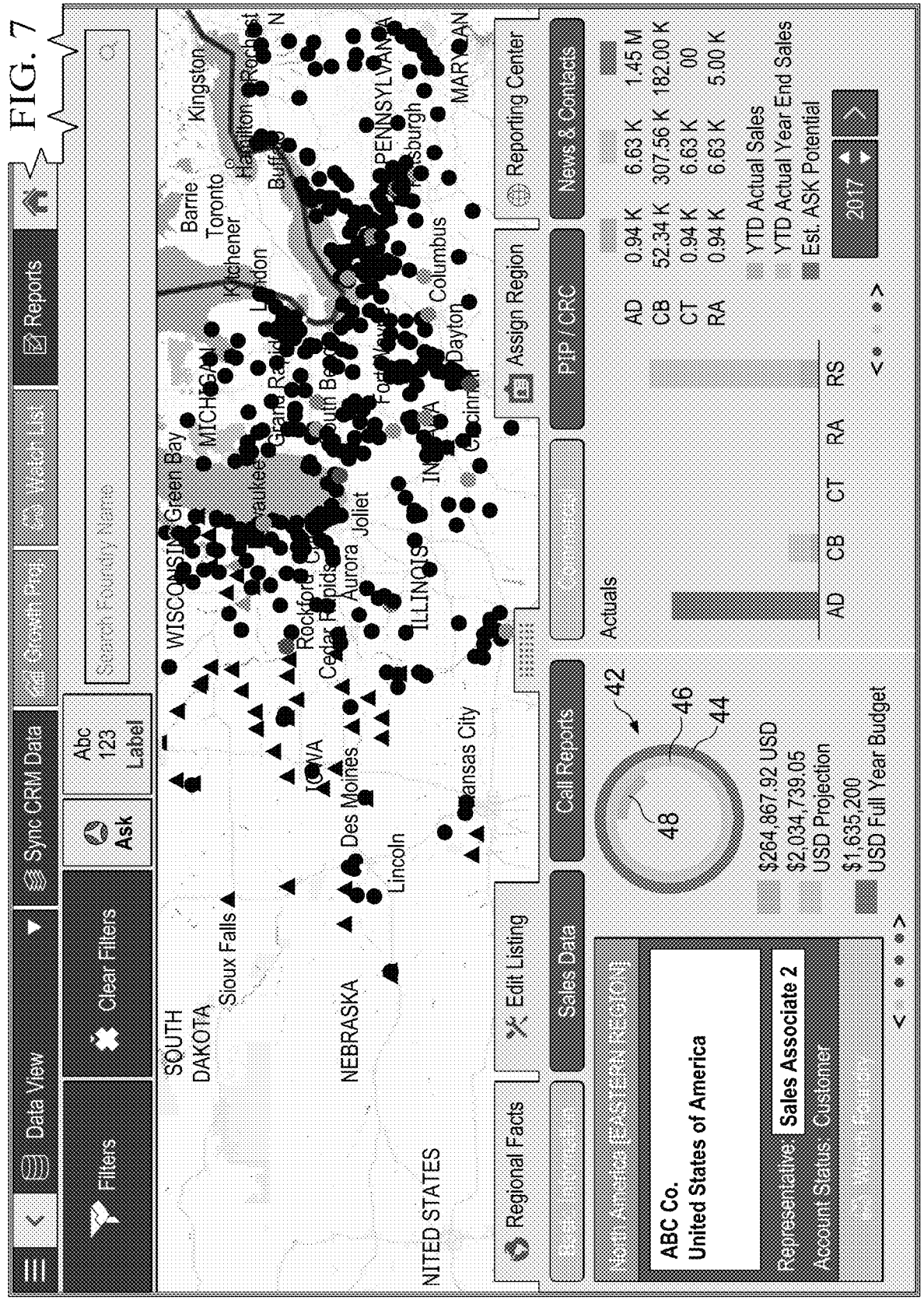
FIG. 7 illustrates one embodiment of the first window showing sales data of the selected sales target in graphical form.

FIG. 7 illustrates one embodiment of the first window showing sales data of the selected sales target in graphical form. As shown, sales data is depicted as a bar graph in a circular shape 42 and where the first bar portion 44 is concentric with second and third bar portions 46, 48 and wherein the first, second and third bar portions are all displayed in different colors. In this embodiment, the first bar portion (first color, e.g., blue) represents potential annual sales, the second bar portion (second color, e.g., yellow) represents estimated annual sales and the third bar portion (third color, e.g., green) represents actual year-to-date (ytd) sales.

Figure 8:
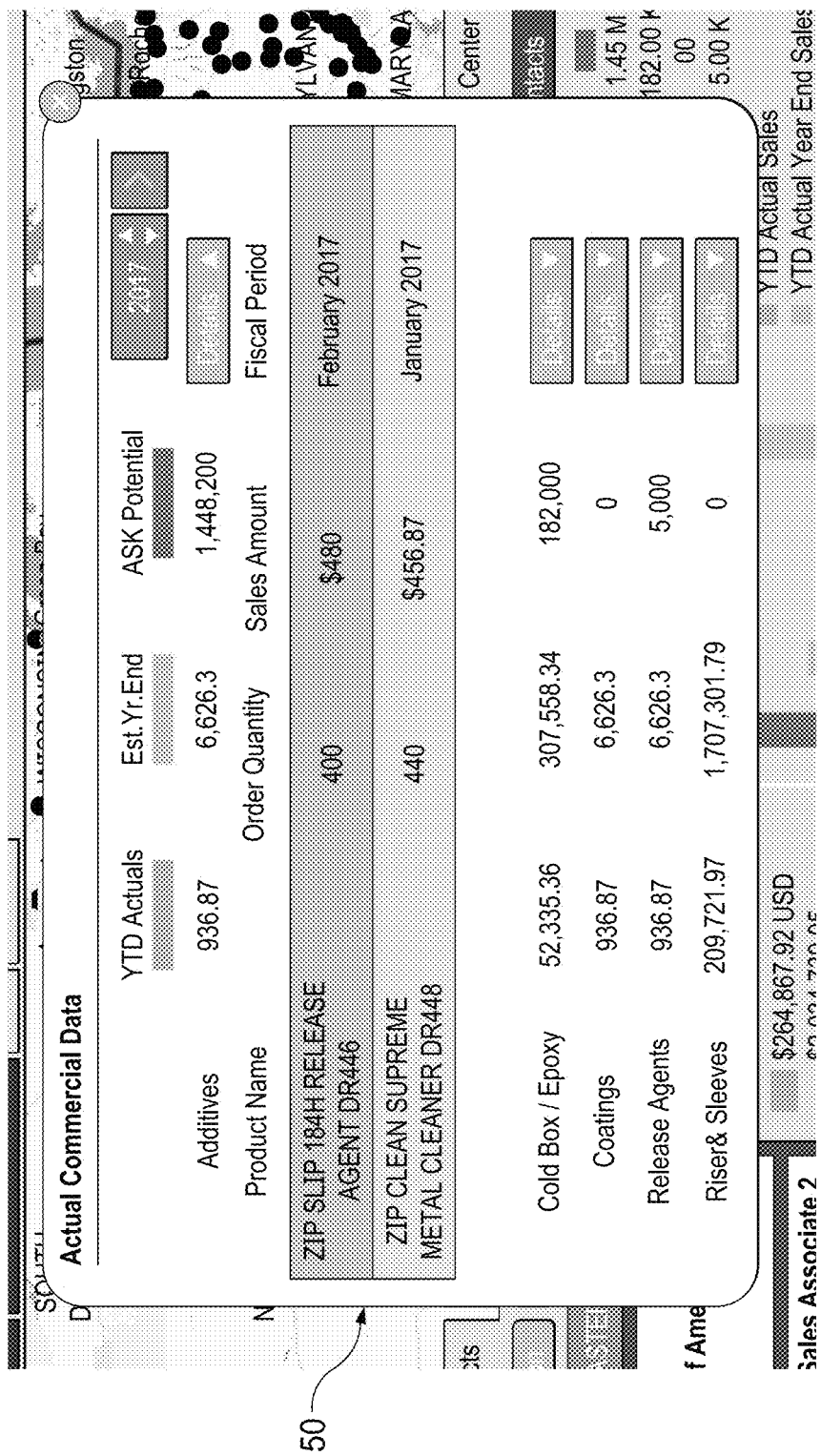
FIG. 8 illustrates one embodiment of another window of the present invention showing detailed sales data for a selected sales target.

In the preferred embodiment, the circle graph is selectable by the user. FIG. 8 illustrates one embodiment of another window of the present invention that is displayed in response to selecting the circle graph (e.g., clicking on it via a mouse device). This window named "actual commercial data" 50 provides more detailed sales data for the selected sales target. For example, this window provides actual, estimated, and potential sales for the selected sales target broken down by product line and by individual products. The user can also view the data over selectable data ranges.

Figure 9:
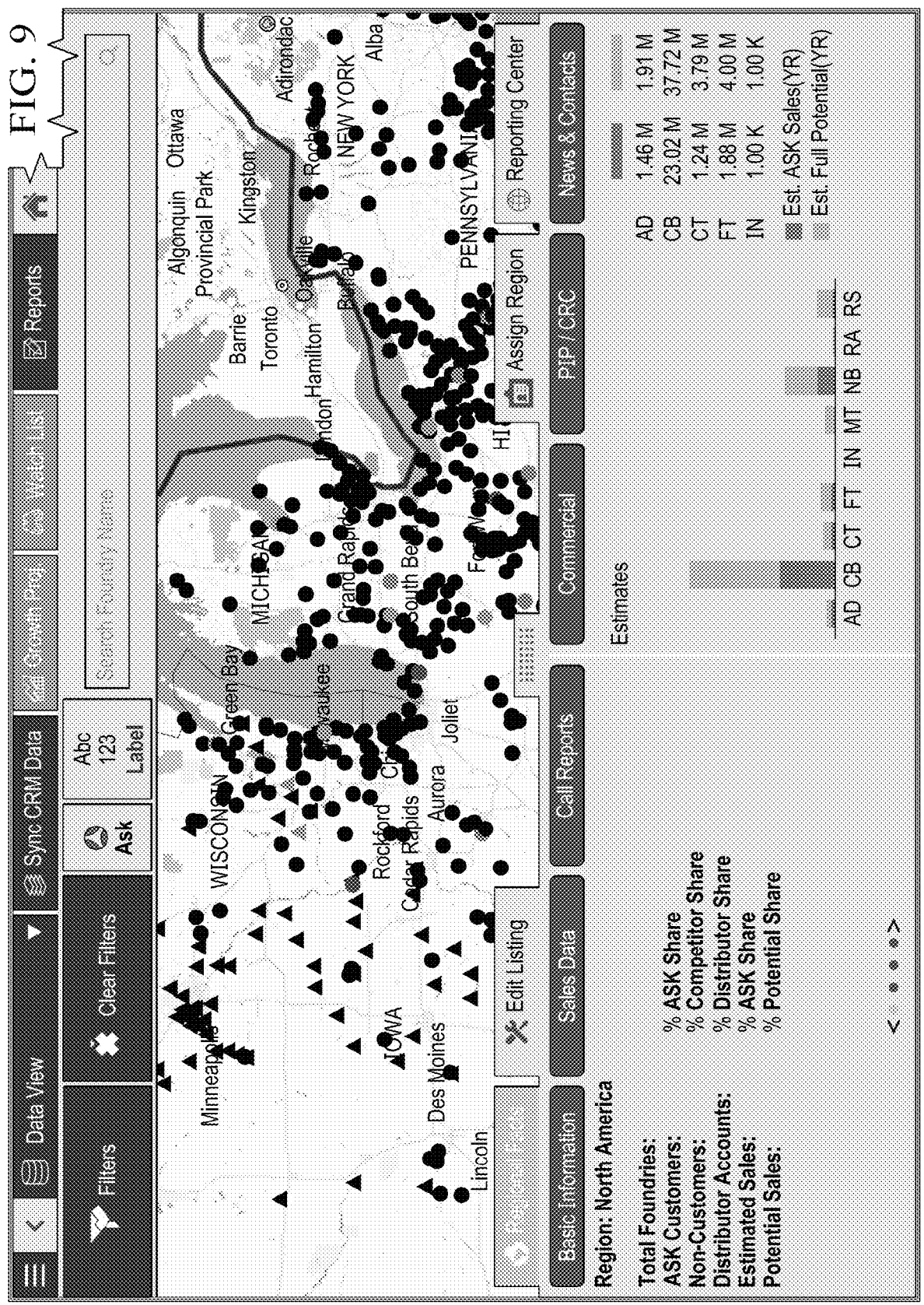
FIG. 9 illustrates one embodiment of the first window of the present invention showing regional information.

FIG. 9 illustrates one embodiment of the first window of the present invention showing regional information. As illustrated, this view provides information relating to the selected region. This view also provides sales data for the selected sales target broken down by product line.

Figure 10:
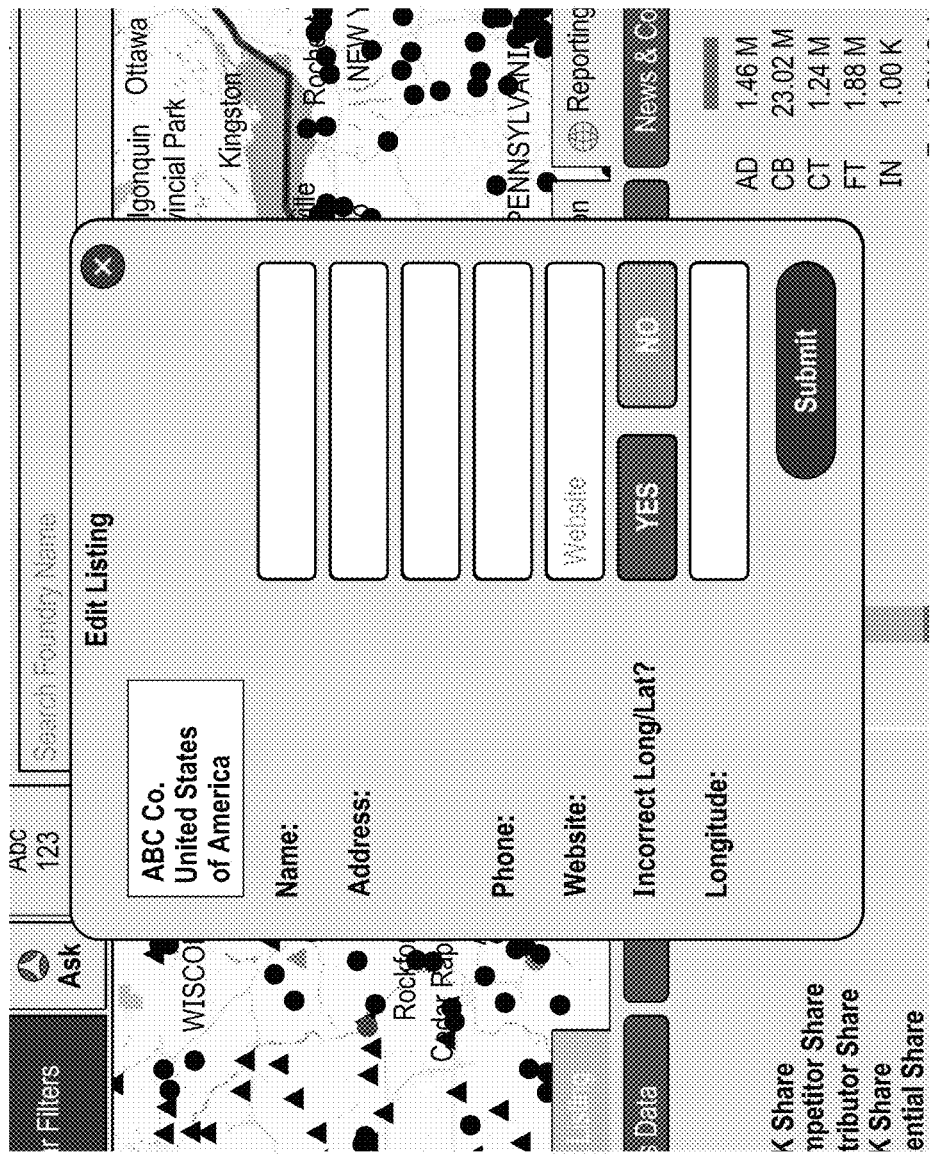
FIG. 10 illustrates one embodiment of the edit listing window of the present invention.
Figure 11:
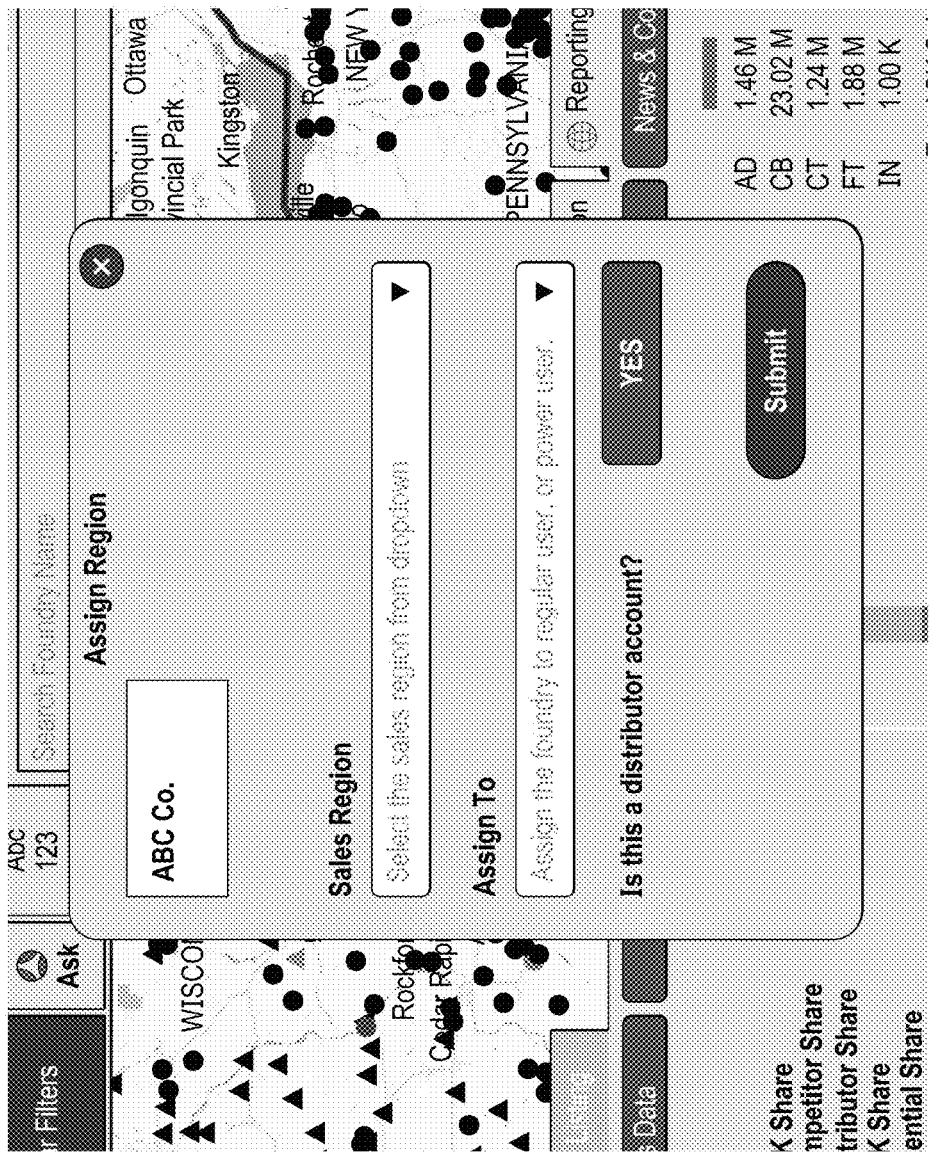
FIG. 11 illustrates one embodiment of the window for assigning sales associates to a particular region.

FIG. 10 illustrates one embodiment of the edit listing window of the present invention. This feature allows authorized users of the system to edit information relating to sales targets. FIG. 11 illustrates one embodiment of the window for assigning sales associates to a particular region.

Figure 12:
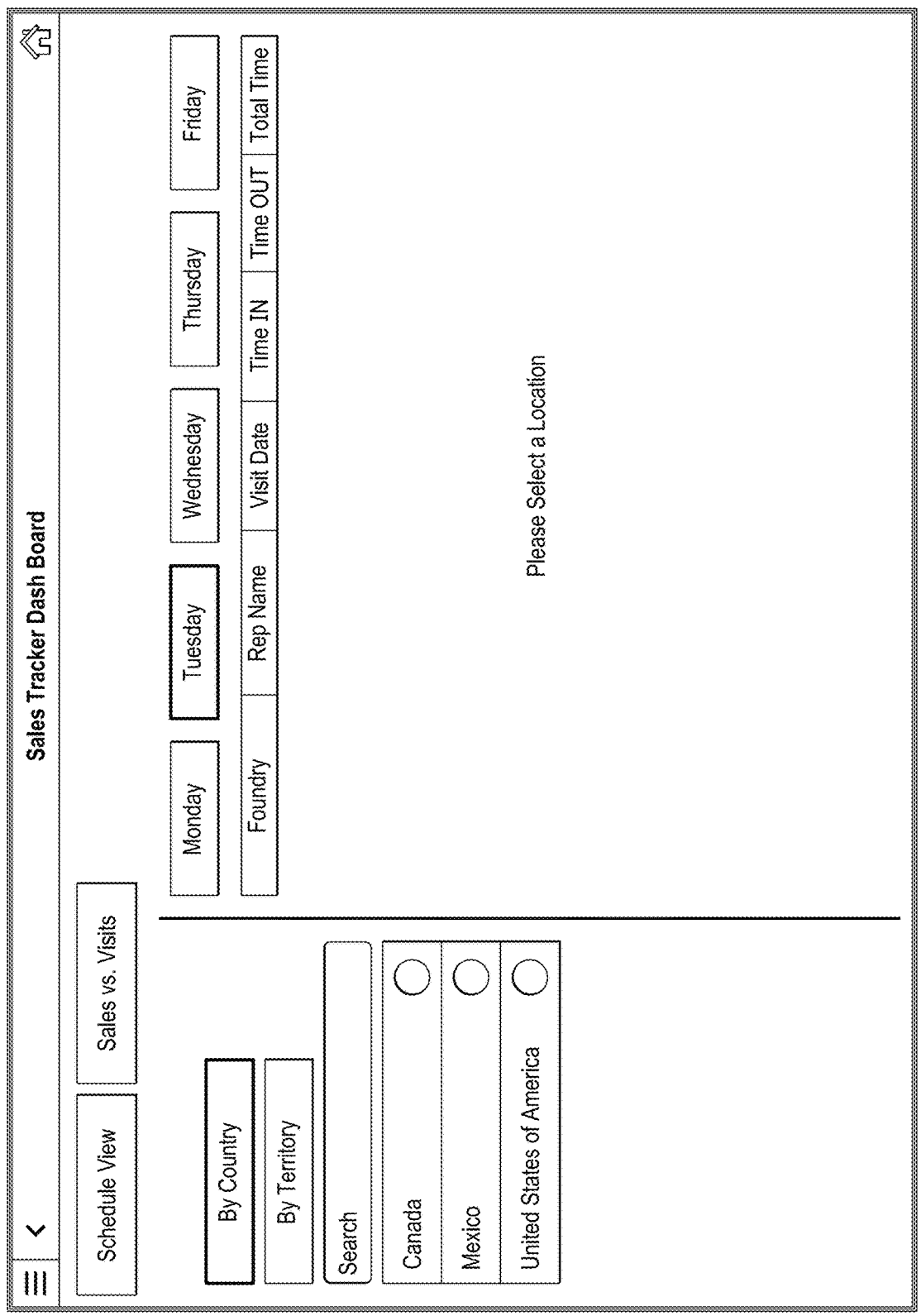
FIG. 12 illustrates one embodiment of the graphical user interface for tracking and displaying sales visit information.

FIG. 12 illustrates one embodiment of the graphical user interface for tracking and displaying sales visit information. As illustrated, sales visits to sales targets can be viewed by country and territory via a schedule view. In this view, sales visit information is displayed and viewed by day.

Figure 13:
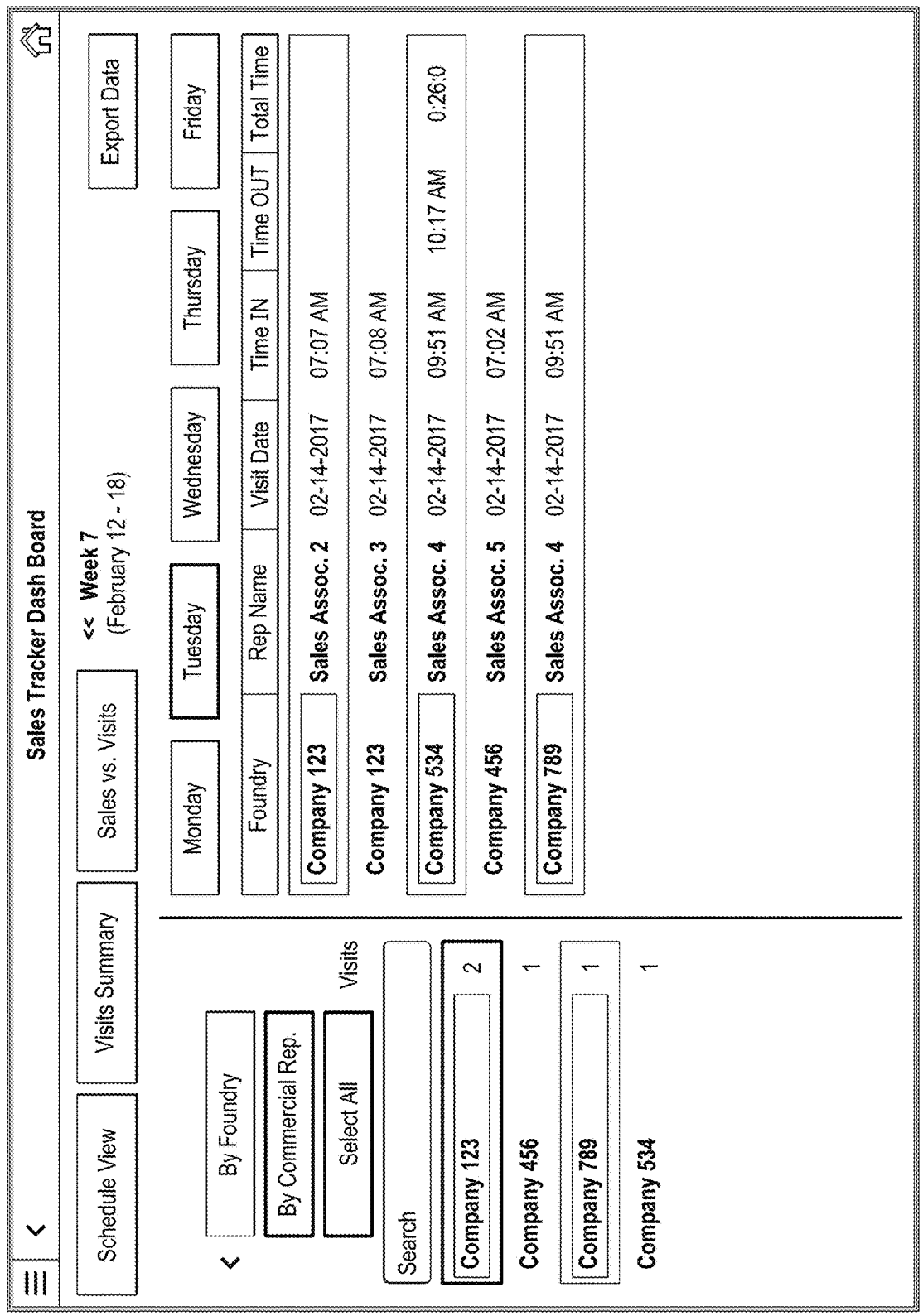
FIG. 13 illustrates one embodiment of the graphical user interface of FIG. 12 showing a listing of sales visits based on sales targets.

FIG. 13 illustrates one embodiment of the graphical user interface of FIG. 12 showing a listing of sales visits based on sales targets (in this embodiment, the sales targets are foundries). As illustrated, the system is adapted to list details of all sales visits made to sales targets on a particular day. In this embodiment, the system provides, sales target name, the name of the sales associate who made the visit, the day of the visit, and the time in and out for the visit.

FIG. 14 illustrates one embodiment of the graphical user interface of FIG. 12 showing a listing of sales visits based on sales associates. The system is also adapted to list sales visits based on company sales associates. This view allows the user to view a list of sales visits made by company sales associates for a selected day.

Figure 15:
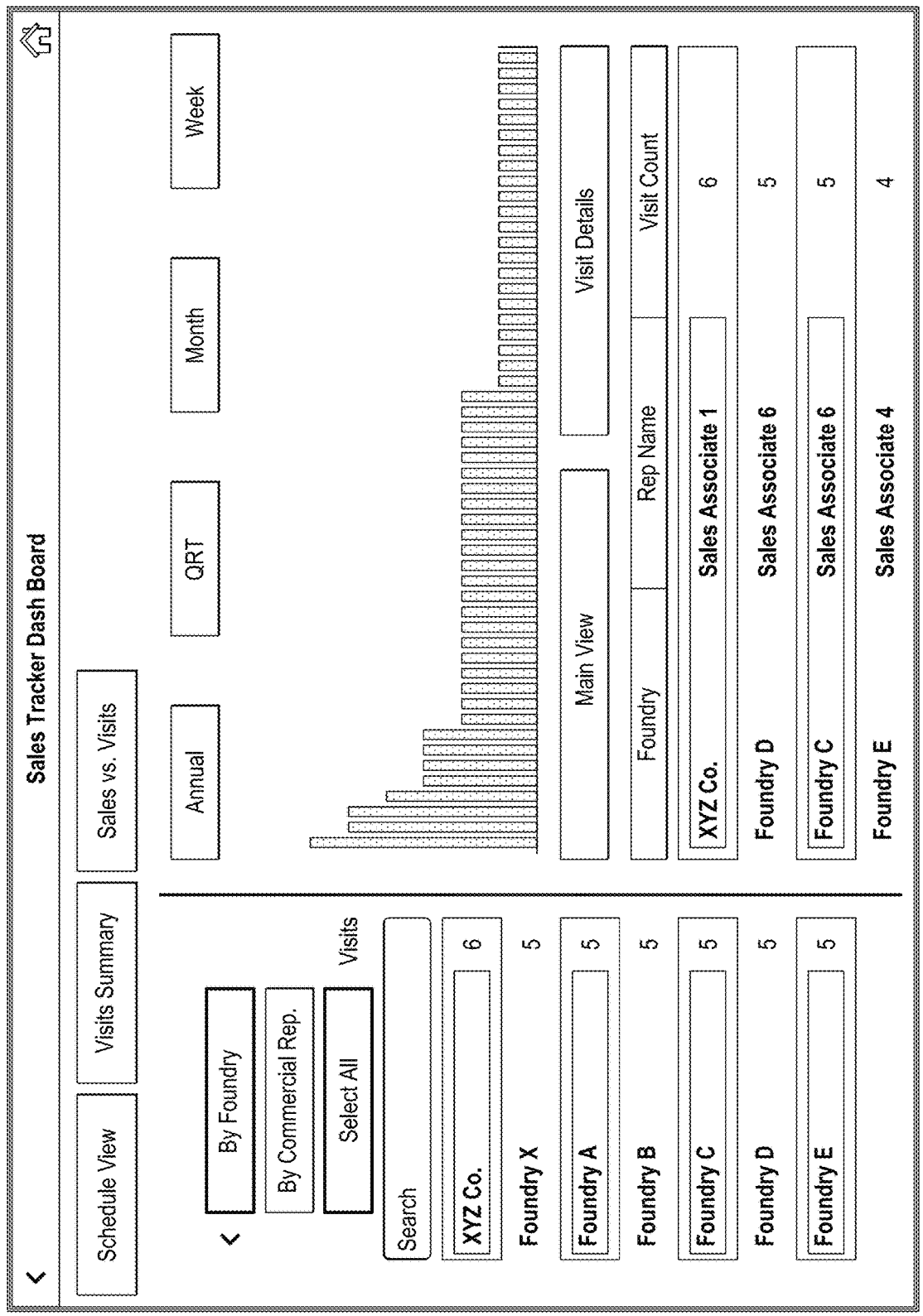
FIG. 15 illustrates one embodiment of the graphical user interface of FIG. 12 showing a graphical view of sales visits for a plurality of sales targets.
Figure 16:
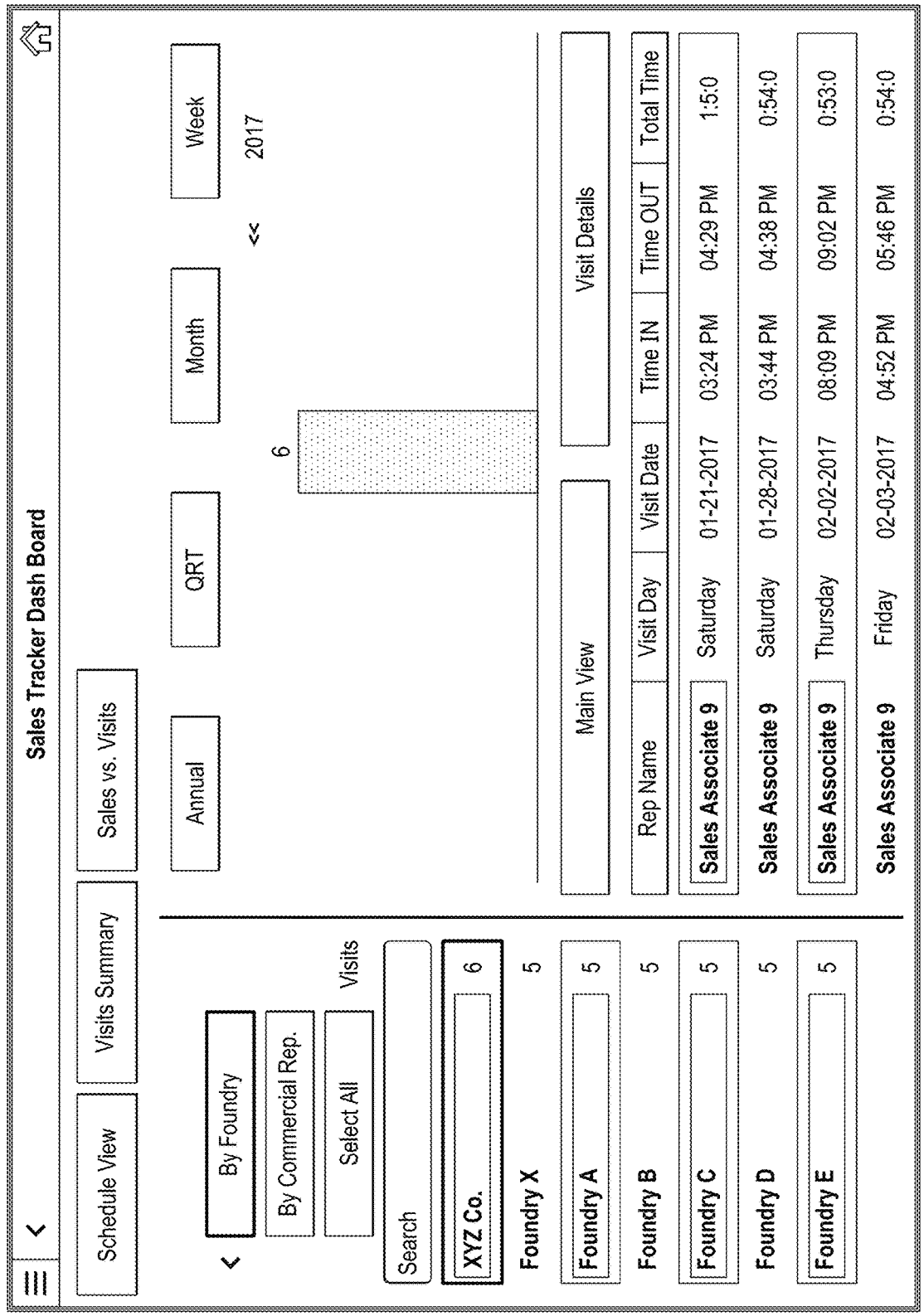
FIG. 16 illustrates one embodiment of the graphical user interface of FIG. 12 showing a graphical view of sales visits for a selected sales target.

FIG. 15 illustrates one embodiment of the graphical user interface of FIG. 12 showing a graphical view of sales visits for a plurality of sales targets. The view provides the number of sales visits made to each of the sales targets for a predetermined period of time (each bar in the graph represents data for a particular sales target and the length of the bar represents the number of visits made to the sales target). For example, the user can view the number of sales visits made to each of the sales targets per year, quarter, month or week. The system is adapted so that the user can select a particular sales target to obtain more detailed information about the sales visits (the sales target can be selected by clicking on the sales target in the left-hand column or by clicking on the bar representing the sales target). FIG. 16 illustrates one embodiment of the graphical user interface of FIG. 12 showing a graphical view of sales visits for a selected sales target (in this embodiment, XYZ Co. is the selected sales target). This view provides detailed information about each sales visit made to this selected sales target.

Figure 17:
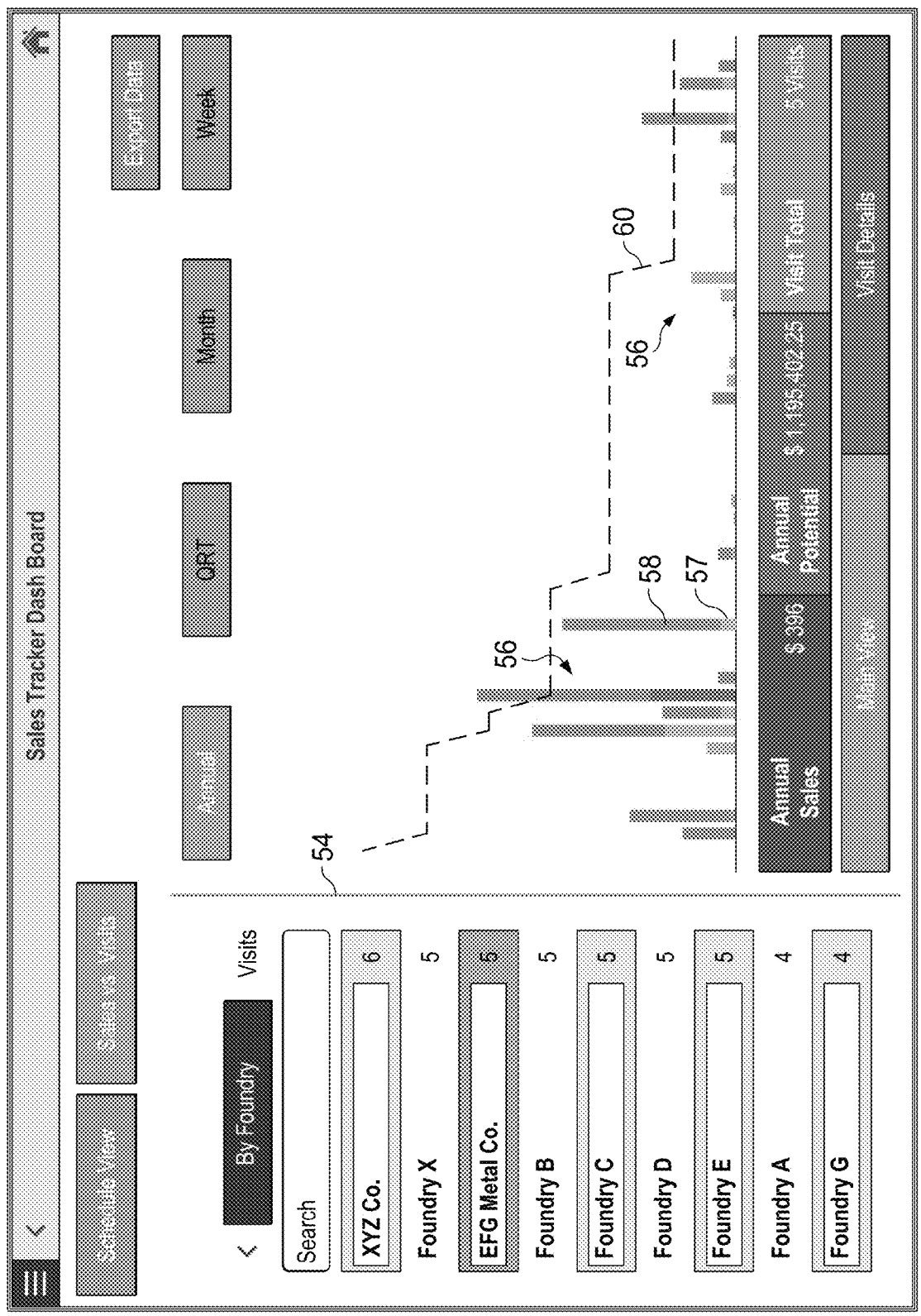
FIG. 17 illustrates one embodiment of the graphical user interface of FIG. 12 showing a graphical view of sales versus sales visits.

FIG. 17 illustrates one embodiment of the graphical user interface of FIG. 12 showing a graphical view of sales versus sales visits. The present invention tracks sales visits to a plurality of sales target locations and facilitates the identification of sales effectiveness by tracking sales versus sales visits. Sales visits to sales target locations are tracked via global positioning devices located in the mobile devices for each of the sales associates. The system stores location information for each of the sales targets and compares this information to the location of each of the sales associates to determine if a sales visit has been made to a sales target.

For example, the GPS devices in the mobile devices for each sales associate transmit location information to the processing system or server of the present invention. The processing system is programmed with instructions for executing on the processing system to: receive the location information sent from the global positioning devices; determine if the mobile devices are within a predetermined distance from one of the plurality of sales target locations; record the number of visits to each of the plurality of sales target locations; and associate one of the sales associates to each of the recorded number of visits (via Identification information sent with the GPS location information).

The system is adapted to display a graph on the graphical user interface, the graph having a first axis 54 for indicating the actual sales amounts for each of the plurality of sales target locations, a plurality of bars 56, each bar associated to one of the plurality of sales target locations. In this embodiment, each of the bars has a first portion 57 for representing the actual sales for each of the plurality of sales target locations for a predetermined time period and a second portion 58 for representing the potential sales for each of the plurality of sales target locations for a predetermined time period. The graph is also comprised of a line 60 perpendicular to the plurality of bars for representing the number of visits to each of the plurality of sales target locations. The system is adapted to dynamically display the plurality of bars and the line representing the number of visits to each of the plurality of sales target locations.

The plurality of bars are selectable, and wherein response to selecting a bar associated with a particular sales target location, the system is adapted to:
a. list the sales visits to the selected sales target location for a predetermined period of time,
b. display in a first region 62 the actual sales to the selected sales target location for a predetermined time period, c. display in a second region 64 the potential sales to the particular sales target location selected for a predetermined time period.

FIG. 18 illustrates one embodiment of the graphical user interface of FIG. 12 showing sales versus visits for a selected sales target.

Figure 19:
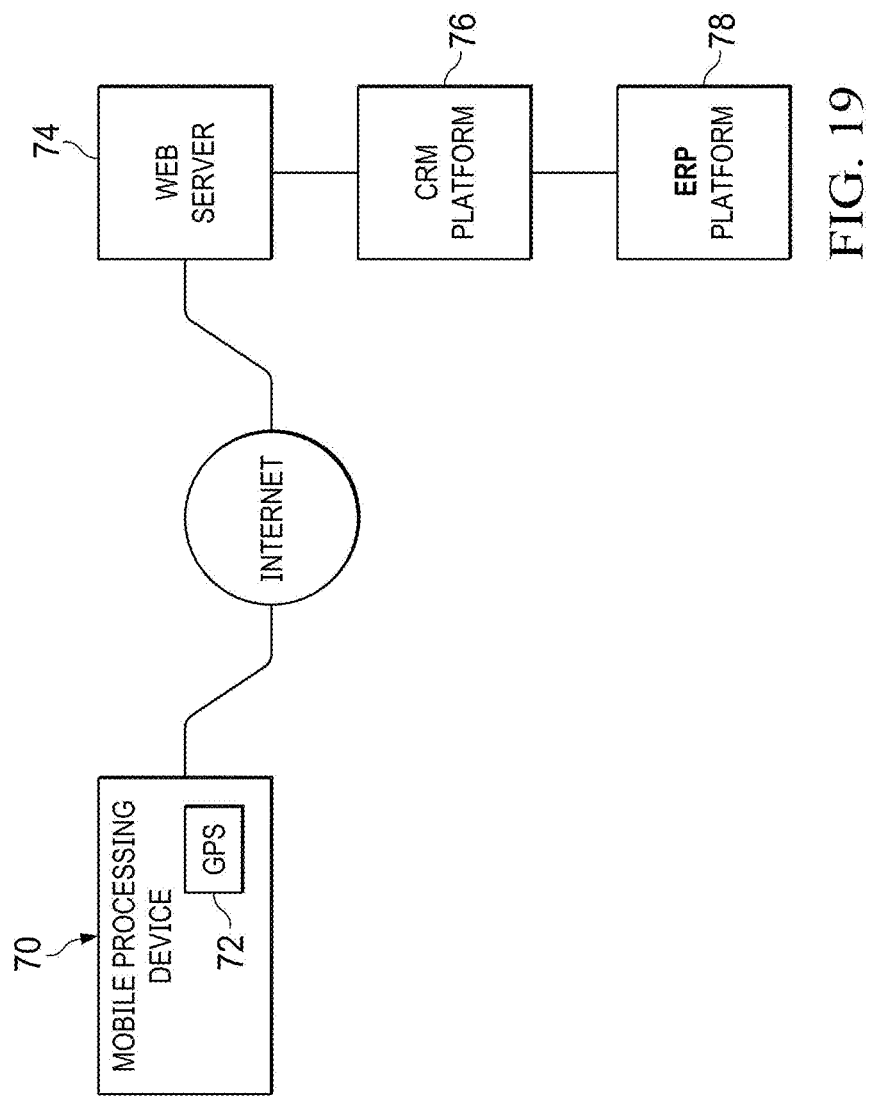
FIG. 19 illustrates a block diagram of one embodiment of the invention.

FIG. 19 illustrates a block diagram of one embodiment of the invention. The present system is comprised of a plurality of mobile processing devices 70, each having a GPS device 72 for sending location information, a Web server 74, a customer relationship management (CRM) platform 76, and an Enterprise Resource Planning (ERP) financial platform 78 for storing financial information.

In this embodiment, each of the sales associates can access the graphical user interface of the present invention on their mobile devices as they travel out in the field. Data can be sent to and from the CRM computing platform through the Internet and a Web server that acts as an intermediary between the mobile devices and the CRM platform. The CRM platform is used to store and process foundry data for use in the system. The CRM platform communicates with the ERP computing platform to obtain actual sales information for each of the sales targets for use in the system. It is understood that the CRM and SAP platforms can be run on a computer network or server system.

Figure 20:
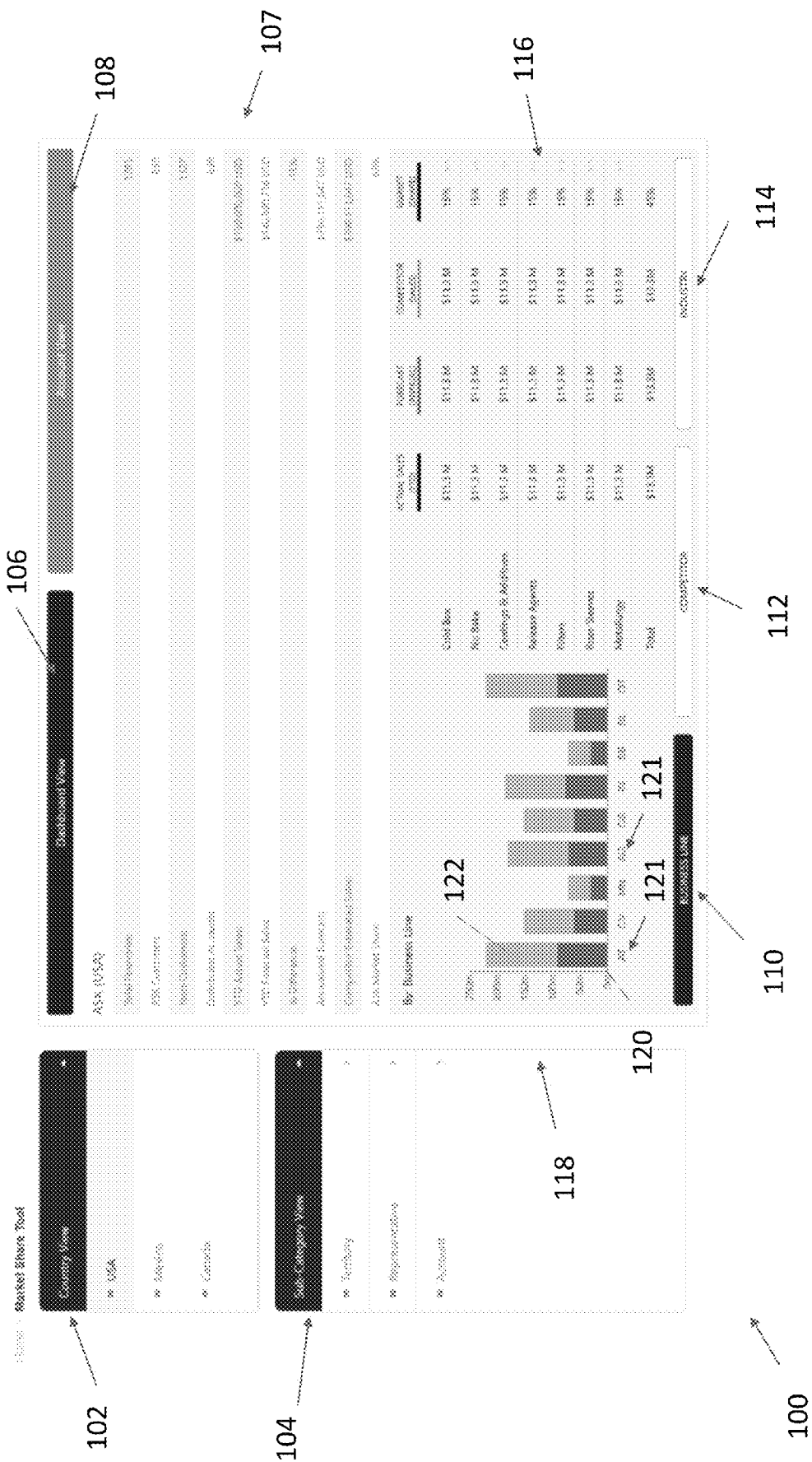
FIG. 20 illustrates one embodiment of a market share tool representing market share by business line.
Figure 21:
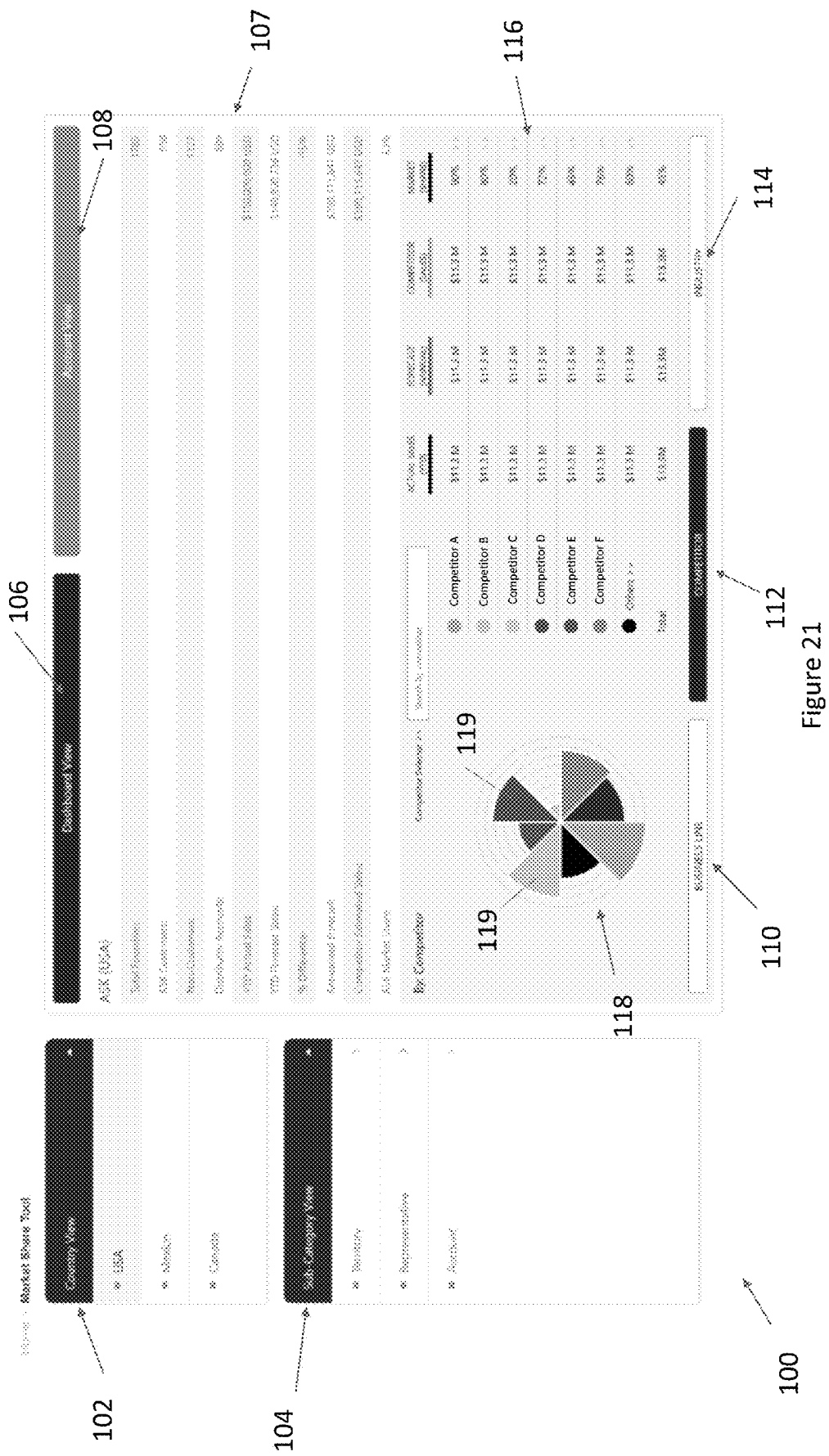
FIG. 21 illustrates another exemplary embodiment of the market share tool of FIG. 20 representing market showing market share by competitor.
Figure 22:
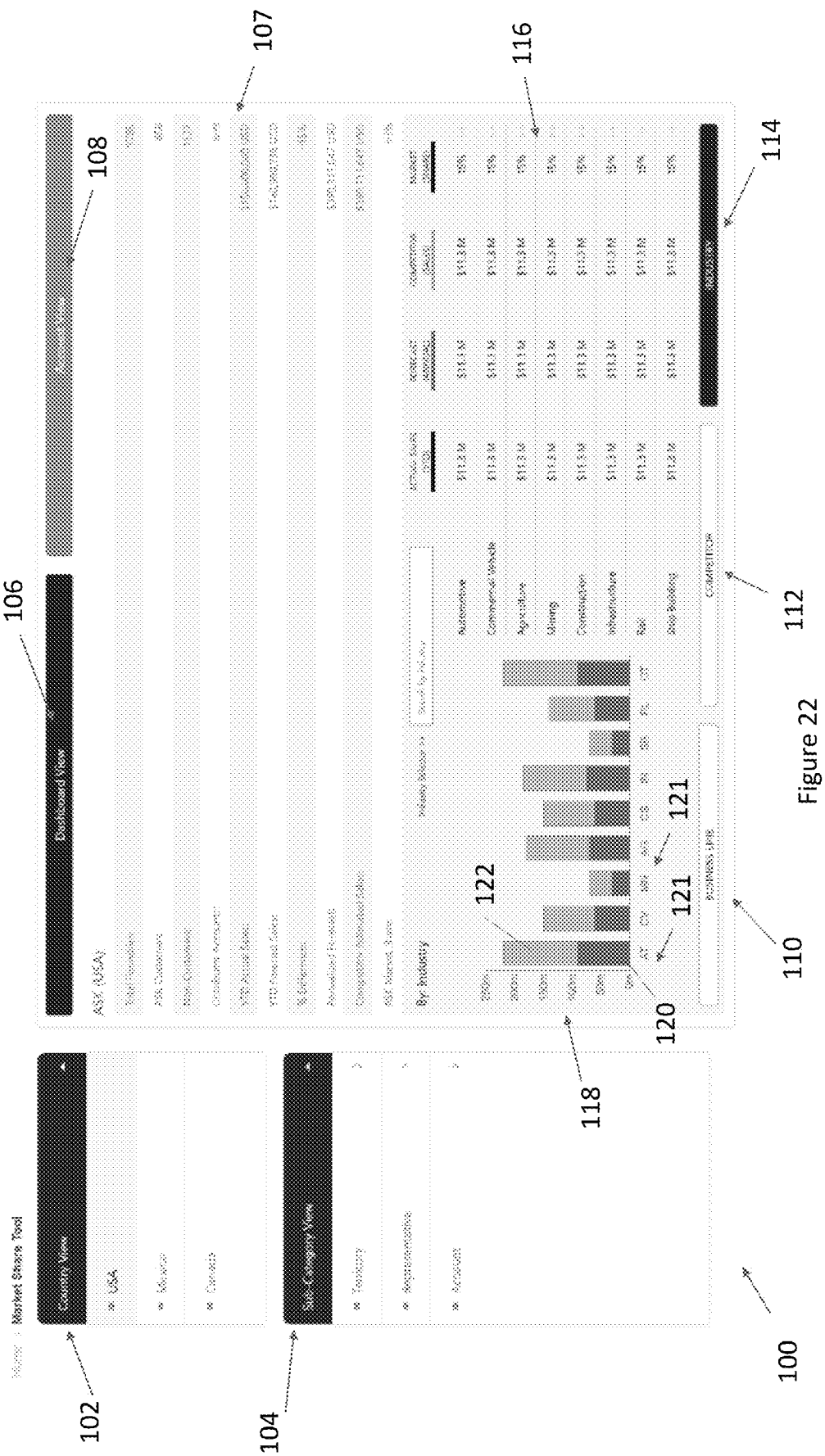
FIG. 22 illustrates another exemplary embodiment of the market share tool of FIG. 20 representing market showing market share by industry.

FIG. 20 through FIG. 22 illustrate various embodiments of a market share tool 100. In exemplary embodiments, the market share tool 100 may utilize accumulated sales data. The accumulated sales data may be categorized in various fashions to arrive at market share data for display at the market share tool 100. The market share data may be updated as additional sales data is developed or otherwise provided. Such updates may be provided continuously or periodically. The market share tool 100 may be in electronic communication with one or more user input devices or databases, such as but not limited to the mobile processing devices 70, the Web server 74, the customer relationship management (CRM) platform 76, the Enterprise Resource Planning (ERP) financial platform 78, some combination thereof, or the like. Regardless, such user input devices or databases may be configured to accept user input as to the market share data to be displayed.

The market share tool 100 may comprise a first view feature 102. The first view feature 102 may comprise options to filter market share data specific to country, such as but not limited to the United States, Mexico, and Canada. The market share tool 100 may comprise a second view feature 104. The second view feature 104 may comprise additional filters such as but not limited to, territory, representative, and account. The items listed with respect to the second view feature 104 may change depending on the first view feature 102 selected, or they may be the same across all first view feature 102 options. Selection of one of the view options, first or second, may be configured to filter out market share data not associated with the selected options.

Figure 23:
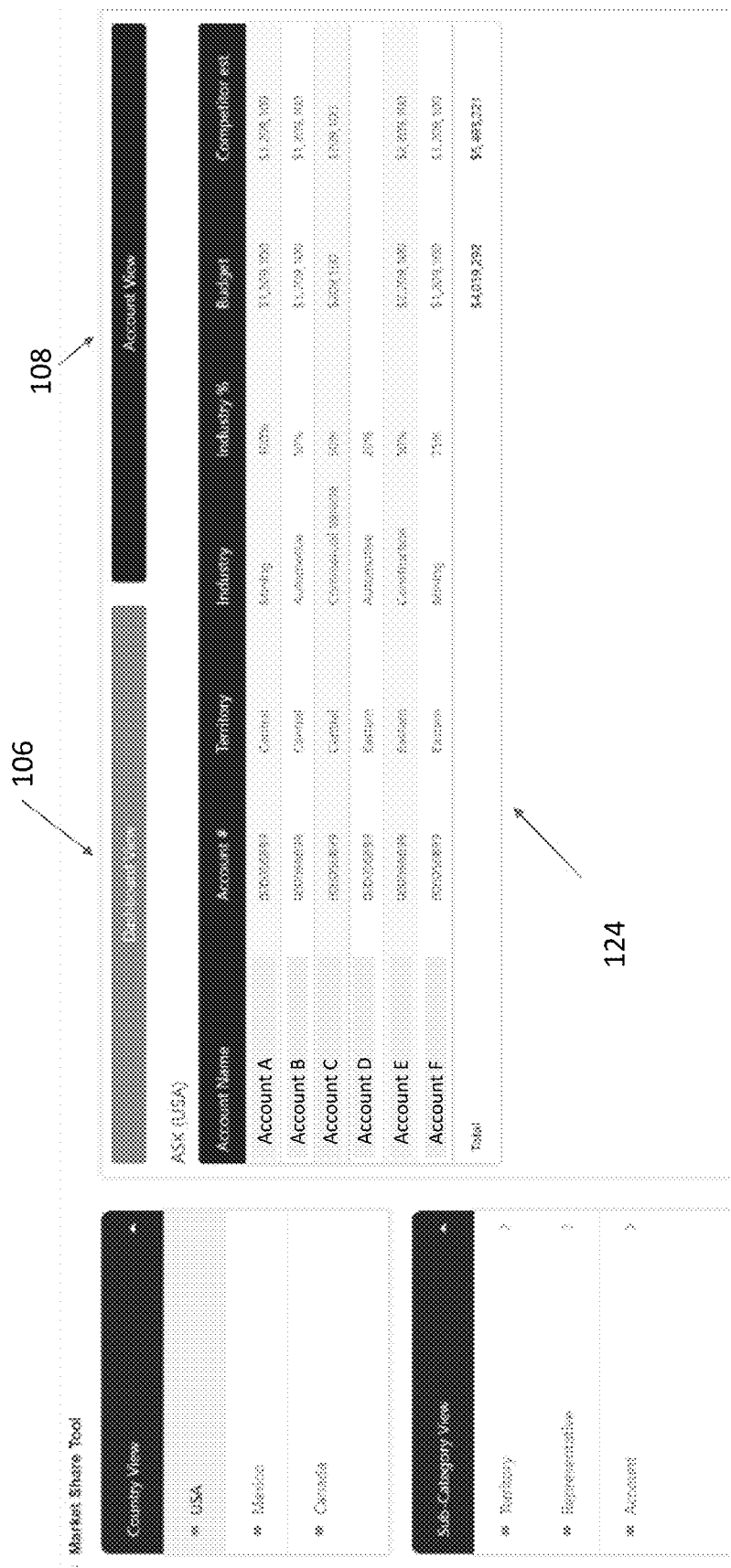
FIG. 23 illustrates an account view of the market share tool of FIG. 20 for exporting market share data.

The market share tool 100 may further comprise a dashboard view 106 and an account view 108. FIGS. 20-22 illustrate the market share data displayed where the dashboard view 106 is selected. FIG. 23 illustrates the market share data displayed where the account view 108 is selected.

Where the dashboard view 106 is selected, a first area 107 may be populated with a variety of information regarding a particular business line, competitor, or industry. Such information may comprise the total number of business locations, the number of such business locations which are customers, the number of such business locations which are not customers, the number of distributor accounts, year to date ("YTD") actual sales, YTD forecast sales, the difference between such YTD actual and forecasted sales, annualized forecast information, competitor estimated sales, market share, some combination thereof, or the like.

In exemplary embodiments, the market share tool 100 may comprise a business line option 110, a competitor option 112, and an industry option 114, though other options for other types of data to be displayed are contemplated. The market share tool 100 with the industry option 114 selected may be shown at FIG. 20. The market share tool 100 with the competitor option 112 selected may be shown at FIG. 21. The market share tool 100 with the business line option 110 selected may be shown at FIG. 22. The various options 110, 112, and 114 may be provided in the form of buttons, switches, selectable icons, some combination thereof, or the like.

Where the dashboard view 106 is selected a second area 116 may be populated with information specific to the business line 110, competitor 112, or industry 114 option selected by the user. The second area 116 may comprise data indicating actual sales, forecasted sales, competitors' sales, and market share for particular categories of products or services where the business line option 110 is selected. Such categories may comprise multiple subcategories for a given category. The top products may be automatically displayed and the remainder may be provided together in a catch-all category. Where the competitor option 112 is selected, the second area 116 may comprise data indicating actual sales, forecasted sales, competitors' sales, and market share information for each of a number of different companies. The top companies may automatically be displayed and the remainder may be provided together in a catch-all category. Where the industry option 114 is selected the second area 116 may comprise data indicating actual sales, forecasted sales, competitors' sales, and market share for each of a number of different industries. Such industries may comprise multiple subcategories for a given industry. The top industries may automatically be displayed and the remainder may be provided together in a catch-all category.

The second area 116 may comprise one or more graphical representations 118 of the market share data. The graphical representations 118 may comprise a bar chart, circle chart, pie chart, line chart, line graph, some combination thereof, or the like. The graphical representations 118 may comprise a series of bars 121. Each bar 121 may comprise one or more portions, including for example without limitation, a first portion 120 and a second portion 122. In other exemplary embodiments, circle chart indicators 119, instead of or in addition to bars 121, may be utilized.

Where the business line option 110 is selected, for example without limitation, the first portion 120 may be configured to reflect the forecasted sales of a given company for the particular product. The second portion 122 may be configured to reflect all sales for the given product. In this way, each bar 121 may quickly illustrate the given companies' forecasted sales of the product compared to the sales by all competitors—thereby demonstrating the given company's market share for that product. Where the competitor option 112 is selected, as another example without limitation, the given company may be shown as a particular indicator 119 and the remaining competitors are shown as other indicators 119. As yet another example, without limitation, where the industry option 114 is selected, the bars 121 may be utilized and the first potion 120 may reflect the forecasted sales for a particular industry, while the second portion 122 may reflect all sales for the particular industry.

FIG. 23 illustrates an account view 108 of the market share tool 100. The account view feature 108 may be configured to permit export of the market share data. The account view feature 108 may comprise one or more tables 124. The tables 124 may comprise the sales data, which may be categorized by business line, competitor, industry, some combination thereof, or the like. The account view 108 may comprise one or more options for exporting the market share data into one of a number of different formats.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing device. The electronic devices may be personal computers, smartphone, tablets, databases, servers, or the like. The electronic connections and transmissions described herein may be accomplished by wired or wireless means.

While certain embodiments of the present invention are described in detail above, the scope of the invention is not to be considered limited by such disclosure, and modifications are possible without departing from the spirit of the invention as evidenced by the following claims.

What is claimed is:

1. A system for obtaining data from geographically disparate sales associates for generation of visualizations identifying market share of sales targets of a company to facilitate effective sales, the system comprising:
   a user device comprising an electronic display;
   one or more databases in electronic communication with each of the number of mobile devices and said user device, said one or more databases comprising sales revenue potential for each of said plurality of sales targets and forecasted sales revenue of said company for each of the plurality of sales targets, wherein portions of said sales revenue potential are electronically associated with one of a number of categories, and wherein portions of said forecasted sales revenue are electronically associated with one of the number of categories;
   a number of mobile devices, each associated with one of a number of sales associates and configured to generate a user interface for entering said sales associate input data comprising sales revenue potential for various ones of each of a plurality of sales targets visited by the associated one of the number of sales associates, wherein said number of mobile devices are configured to electronically transmit said entered sales associate input data from said number of mobile devices to said one or more databases; and
   one or more electronic storage devices associated with the user device and comprising software instructions, which when executed by one or more processors associated with the user device, configure the one or more processors to:
   graphically display, at the electronic display of the user device, a business line option, competitor option, and industry option;
   receive data from the user device indicative of user input received at the user device indicating a type of market share analysis to be performed as selected from the graphically displayed business line option, competitor option, and industry option;
   query the database to retrieve sales revenue potential and forecasted sales revenue for each of the plurality of sales targets;
   categorize the retrieved sales revenue potential into at least one of a number of categories, wherein each of said number of categories are selected to reflect the type of market share analysis selected; and
   generate one or more graphical representations at the electronic display of the user device comprising a bar for each of the number of categories, wherein a first portion of the bar reflects a total value of the retrieved potential sales revenue categorized into a particular one of the number of categories and a second portion of the bar reflects the retrieved forecasted sales revenue for the company in the particular one of the number of categories.

2. The system of claim 1 wherein:
said one or more graphical representations comprise a bar chart.

3. The system of claim 2 wherein:
said user input comprises a selection of the business line option; and
each of said number of categories comprise one of a number of products.

4. The system of claim 2 wherein:
said user input comprises a selection of the competitor option; and
each of said number of categories comprise one of a number of competitors.

5. The system of claim 2 wherein:
said user input comprises a selection of the industry option; and
each of said number of categories comprise one of a number of industries.

6. The system of claim 1 wherein:
said first portion comprises a first color; and
said second portion comprises a second color.

7. The system of claim 1 wherein:
said one or more graphical representations comprise a selectable export option.

8. The system of claim 7 further comprising:
additional software instructions stored at the one or more electronic storage devices, which when executed by the one or more processors, configures the one or more processors to, upon selection of the selectable export option:
   format said retrieved potential sales revenue and said retrieved forecasted sales revenue into a particular format; and
   provide a downloadable copy of said formatted data.

9. The system of claim 1 further comprising:
additional software instructions stored at the one or more electronic storage devices, which when executed by the one or more processors, configures the one or more processors to:
graphically generate a first view option and a second view option;
receive data indicating from the user device indicative of further user input at the user device indicating selection of the first view option;
graphically display, at the electronic display of the user device, a list of countries, wherein said sales revenue potential and forecasted sales revenue of the company for each of the plurality of sales targets stored at said database is each associated with one of a plurality of countries;
receive data indicating from the user device indicative of further user input at the user device indicating selection of one of the countries in the list of countries; and
filter said retrieved sales revenue potential and forecasted sales revenue to exclude data not associated with the selected one of the list of countries.

10. The system of claim 1 further comprising:
additional software instructions stored at the one or more electronic storage devices, which when executed by the one or more processors, configures the one or more processors to:
receive data from the user device indicative of further user input at the user device indicating selection of the first view option;
graphically display, at the electronic display of the user device, a list of territories, representatives, and accounts, wherein said sales revenue potential and forecasted sales revenue of the company for each of the plurality of sales targets stored at said database is each associated with one of a plurality of territories, representatives, and accounts;
receive data from the user device indicative of further user input at the user device indicating selection of one of the list of territories, representatives, and accounts; and
filter said retrieved sales revenue potential and forecasted sales revenue to exclude data not associated with the selected one of the list of territories, representatives, and accounts.

11. The system of claim 1 wherein:
each of said number of mobile electronic devices separately comprise one or more electronic storage devices comprising executable software instructions, which when executed by one or more processors of the number of mobile electronic devices, configure each of the number of mobile electronic devices to:
electronically generate a map of a geographic region;
dynamically display, on the map, a plurality of selectable icons, each representing one of the plurality of sales targets at positions corresponding with geographic locations of the plurality of sales targets; and
in response to selection of a particular one of the plurality of sales targets, generate a prompt for said sales associate input data.

12. A system for obtaining data from geographically disparate sales associates for generation of visualization identifying market share of sales targets of a company to facilitate effective sales, the system comprising:
a user device comprising an electronic display;
one or more databases in electronic communication with each of the number of mobile devices and said user device, said one or more databases comprising said sales revenue potential for each of said plurality of sales targets and forecasted sales revenue of said company for each of the plurality of sales targets, wherein portions of said sales revenue potential are electronically associated with one of a number of categories, and wherein portions of said forecasted sales revenue are electronically associated with one of the number of categories, and wherein said sales revenue potential and forecasted sales revenue of the company for each of the plurality of sales targets stored at said database is each electronically associated with one of a plurality of countries;
a number of mobile devices, each associated with one of a number of sales associates and configured to generate a user interface for entering sales associate input data comprising sales revenue potential for various ones of each of a plurality of sales targets visited by the associated one of the number of sales associates wherein said number of mobile devices are configured to electronically transmit said entered sales associate input database from said number of mobile devices to said one or more databases; and
one or more electronic storage devices associated with the user device and comprising software instructions, which when executed by one or more processors, configure the one or more processors associated with the user device to:
graphically display, at the electronic display of the user device, a number of options regarding market share analysis to be performed;
receive data from the user device indicative of user input at the user device indicating a type of market share analysis to be performed as selected from the number of options;
query the database to retrieve sales revenue potential and forecasted sales revenue for each of the plurality of sales targets;
categorize the retrieved sales revenue potential into at least one of a number of categories, wherein each of said number of categories are selected to reflect the type of market share analysis selected;
graphically generate a first view option;
receive data from the user device indicative of further user input at the user device indicating selection of the first view option;
graphically display, at the electronic display of the user device, a list of countries;
receive data from the user device indicative of further user input at the user device indicating selection of one of the countries in the list of countries; and
filter said retrieved sales revenue potential and forecasted sales revenue to exclude data not associated with the selected one of the list of countries; and
generate one or more graphical representations at the electronic display comprising a bar for each of the number of categories as filtered, wherein a first portion of the bar reflects a total value of the retrieved potential sales revenue categorized into a particular one of the number of categories and a second portion of the bar reflects the retrieved forecasted sales revenue for the company in the particular one of the number of categories.

13. A system for obtaining data from geographically disparate sales associates for generation of visualizations identifying market share of sales targets of a company to facilitate effective sales, the system comprising:
- a user device comprising an electronic display;
- a number of mobile devices, each associated with one of a number of sales associates and configured to generate a user interface for entering sales associate input data comprising sales revenue potential for various ones of each of a plurality of sales targets visited by the associated one of the number of sales associates;
- one or more databases in electronic communication with each of the number of mobile devices and said user device, said one or more databases and comprising said sales revenue potential for each of said plurality of sales targets as received from said number of mobile devices and forecasted sales revenue of said company for each of the plurality of sales targets, wherein portions of said sales revenue potential are associated with one of a number of categories, and wherein portions of said forecasted sales revenue are associated with one of the number of categories; and
- one or more electronic storage devices associated with the user device and comprising software instructions, which when executed by one or more processors associated with the user device, configure the one or more processors to:
  - graphically display, at the electronic display of the user device, a number of types of market share analysis that may be performed;
  - receive data from the user device indicative of user input received at the user device indicating selection of one of the number of types of market share analysis to be performed;
  - query the database to retrieve sales revenue potential and forecasted sales revenue for each of the plurality of sales targets;
  - categorize the retrieved sales revenue potential into at least one of a number of categories, wherein each of said number of categories are selected to reflect the type of market share analysis selected; and
  - generate one or more graphical representations at the electronic display comprising a bar for each of the number of categories, wherein a first portion of the bar reflects a total value of the retrieved potential sales revenue categorized into a particular one of the number of categories and a second portion of the bar reflects the retrieved forecasted sales revenue for the company in the particular one of the number of categories;
- wherein said number of mobile devices are configured to electronically transmit said entered sales associate input database from said number of mobile devices to said one or more databases.

14. The system of claim 12 wherein:

each of said number of mobile electronic devices separately comprise one or more electronic storage devices comprising executable software instructions, which when executed by one or more processors of the number of mobile electronic devices, configure each of the number of mobile electronic devices to:
- electronically generate a map of a geographic region;
- dynamically display, on the map, a plurality of selectable icons, each representing one of the plurality of sales targets at positions corresponding with geographic locations of the plurality of sales targets; and
- in response to selection of a particular one of the plurality of sales targets, generate a prompt for said sales associate input data.

15. The system of claim 13 wherein:

each of said number of mobile electronic devices separately comprise one or more electronic storage devices comprising executable software instructions, which when executed by one or more processors of the number of mobile electronic devices, configure each of the number of mobile electronic devices to:
- electronically generate a map of a geographic region;
- dynamically display, on the map, a plurality of selectable icons, each representing one of the plurality of sales targets at positions corresponding with geographic locations of the plurality of sales targets; and
- in response to selection of a particular one of the plurality of sales targets, generate a prompt for said sales associate input data.

* * * * *